United States Patent
Peters et al.

(10) Patent No.: US 10,516,703 B2
(45) Date of Patent: Dec. 24, 2019

(54) MONITORING AND CONTROLLING THE STATUS OF A COMMUNICATION SESSION

(71) Applicant: PRECISION BIOMETRICS, INC., Seattle, WA (US)

(72) Inventors: Michael Lawrence Peters, San Carlos, CA (US); David Marcarian, Seattle, WA (US)

(73) Assignee: Precision Biometrics, Inc., Seattle, WA (US)

( * ) Notice: Subject to any disclaimer, the term of this patent is extended or adjusted under 35 U.S.C. 154(b) by 0 days.

(21) Appl. No.: 15/452,603

(22) Filed: Mar. 7, 2017

(65) Prior Publication Data
US 2017/0257400 A1    Sep. 7, 2017

Related U.S. Application Data

(60) Provisional application No. 62/304,871, filed on Mar. 7, 2016.

(51) Int. Cl.
*H04L 29/06* (2006.01)
*H04L 12/18* (2006.01)

(52) U.S. Cl.
CPC ...... *H04L 65/1066* (2013.01); *H04L 12/1831* (2013.01)

(58) Field of Classification Search
None
See application file for complete search history.

(56) References Cited

U.S. PATENT DOCUMENTS

| | | |
|---|---|---|
| 5,818,513 A | 10/1998 | Sano et al. |
| 6,614,465 B2 | 9/2003 | Alexander et al. |
| D612,832 S | 3/2010 | Li et al. |
| 8,019,069 B1 | 9/2011 | Cyriac et al. |
| 8,199,927 B1 * | 6/2012 | Raftery ............... H04M 9/082 370/286 |

(Continued)

FOREIGN PATENT DOCUMENTS

| | | |
|---|---|---|
| CN | 101808220 A | 8/2010 |
| WO | 2007140668 A1 | 12/2007 |
| WO | 2014114079 A1 | 7/2014 |

OTHER PUBLICATIONS

Phoenix Audio Technologies, "Quattro 3 Conference Speakerphones Model 301" User Manual, 8 pages.

*Primary Examiner* — Bunjob Jaroenchonwanit
(74) *Attorney, Agent, or Firm* — John W. Branch; Lowe Graham Jones PLLC

(57) ABSTRACT

Embodiments are directed to a communication-session (CS) module that monitors the status of a communication session and at least partially controls the status. The CS module provides a party participating in a communication session an indication of whether a status of a microphone the user is employing to participate in an audio and/or video communication session is in a mute (or off) state, or whether the microphone status is in a live (or on) state. Likewise, a CS module may indicate to a user whether a status of a camera that the user is employing to participate in a video communication session is in an off state, or whether the camera status is in an on (or live) state. As such, a CS module provides users reminders of whether or not the microphone and/or camera, is in a live state, a mute state, or is otherwise turned on or off.

16 Claims, 10 Drawing Sheets

(56) References Cited

U.S. PATENT DOCUMENTS

| | | | |
|---|---|---|---|
| 8,358,327 B2 | 1/2013 | Duddy et al. | |
| 8,483,757 B2* | 7/2013 | Bodley | H04B 1/38 |
| | | | 381/334 |
| 8,576,272 B2 | 11/2013 | Wu et al. | |
| 8,605,863 B1* | 12/2013 | Sauriol | H04L 65/4015 |
| | | | 379/32.01 |
| 8,639,299 B2 | 1/2014 | Kalra et al. | |
| 8,666,051 B2 | 3/2014 | Gilzean et al. | |
| 8,860,774 B1 | 10/2014 | Sheeley et al. | |
| 9,024,894 B1* | 5/2015 | Smith | G06F 3/0488 |
| | | | 345/156 |
| 9,064,398 B2 | 6/2015 | Davis | H04W 4/023 |
| 9,671,493 B1* | 6/2017 | Khosla | G01S 13/867 |
| 2002/0059431 A1* | 5/2002 | Terada | G06Q 30/06 |
| | | | 709/227 |
| 2003/0138119 A1* | 7/2003 | Pocino | H04M 3/561 |
| | | | 381/119 |
| 2004/0218752 A1* | 11/2004 | Huang | H04M 1/6033 |
| | | | 379/387.01 |
| 2005/0195823 A1* | 9/2005 | Chen | H04L 12/185 |
| | | | 370/395.1 |
| 2005/0280546 A1* | 12/2005 | Ganley | G08B 13/1427 |
| | | | 340/573.4 |
| 2007/0061488 A1* | 3/2007 | Alagappan | G06F 17/30905 |
| | | | 709/246 |
| 2007/0111743 A1* | 5/2007 | Leigh | H04L 12/1818 |
| | | | 455/518 |
| 2007/0172135 A1* | 7/2007 | Song | H04N 19/46 |
| | | | 382/232 |
| 2007/0263805 A1 | 11/2007 | McDonald | |
| 2008/0240390 A1* | 10/2008 | Van Loon | H04M 1/02 |
| | | | 379/202.01 |
| 2008/0259731 A1* | 10/2008 | Happonen | G10K 11/34 |
| | | | 367/121 |
| 2008/0274696 A1* | 11/2008 | Bakshi | H04M 1/6066 |
| | | | 455/41.2 |
| 2009/0061822 A1* | 3/2009 | Govindachari | H04M 1/6066 |
| | | | 455/411 |
| 2009/0254839 A1* | 10/2009 | Kripalani | G06F 3/0231 |
| | | | 715/753 |
| 2010/0013918 A1* | 1/2010 | Ta'Eed | H04N 1/00106 |
| | | | 348/143 |
| 2010/0283600 A1* | 11/2010 | Herbert | G08B 13/1427 |
| | | | 340/539.1 |
| 2011/0169654 A1* | 7/2011 | Ketari | G08B 13/1427 |
| | | | 340/687 |
| 2012/0176496 A1* | 7/2012 | Carbonell | H04N 7/188 |
| | | | 348/143 |
| 2012/0298119 A1* | 11/2012 | Reese | E05B 75/00 |
| | | | 128/875 |
| 2013/0003951 A1* | 1/2013 | Pitschel | H04M 3/4285 |
| | | | 379/93.13 |
| 2013/0005354 A1* | 1/2013 | Sheilendra | H04W 4/029 |
| | | | 455/456.1 |
| 2013/0080571 A1* | 3/2013 | Kirkeby | H04N 21/41407 |
| | | | 709/217 |
| 2013/0090103 A1* | 4/2013 | Kim | H04M 1/72577 |
| | | | 455/418 |
| 2013/0283163 A1* | 10/2013 | Mehringer | G06F 3/048 |
| | | | 715/719 |
| 2013/0290522 A1* | 10/2013 | Behm, Jr. | H04L 43/10 |
| | | | 709/224 |
| 2013/0298208 A1* | 11/2013 | Ayed | G06F 21/00 |
| | | | 726/6 |
| 2014/0018112 A1* | 1/2014 | Cohen-Zur | H04W 4/04 |
| | | | 455/457 |
| 2014/0049594 A1* | 2/2014 | Davis | H04M 3/567 |
| | | | 348/14.08 |
| 2014/0146125 A1 | 5/2014 | Kristiansen et al. | |
| 2014/0219260 A1* | 8/2014 | Cardona | H04W 8/005 |
| | | | 370/338 |
| 2014/0267577 A1 | 9/2014 | Weber et al. | |
| 2014/0317081 A1* | 10/2014 | Dubois-Ferriere | H04L 67/22 |
| | | | 707/706 |
| 2014/0354765 A1 | 12/2014 | Yi | |
| 2014/0354838 A1* | 12/2014 | Bolton | H04M 1/7253 |
| | | | 348/211.4 |
| 2015/0065104 A1* | 3/2015 | White | H04M 3/565 |
| | | | 455/416 |
| 2015/0109399 A1 | 4/2015 | Kuscher et al. | |
| 2015/0130604 A1* | 5/2015 | Gomez Collazo | B60N 2/002 |
| | | | 340/457 |
| 2015/0140896 A1* | 5/2015 | Maiti | A63H 33/26 |
| | | | 446/484 |
| 2015/0381934 A1* | 12/2015 | Kondo | H04N 7/152 |
| | | | 348/14.09 |
| 2016/0062620 A1* | 3/2016 | Simon | G06F 3/04847 |
| | | | 715/767 |
| 2016/0127641 A1* | 5/2016 | Gove | G06T 1/0007 |
| | | | 348/143 |
| 2016/0135271 A1* | 5/2016 | Alexander | H05B 37/0272 |
| | | | 315/297 |
| 2016/0171851 A1* | 6/2016 | Anson | G08B 21/24 |
| | | | 340/539.1 |
| 2016/0225249 A1* | 8/2016 | Caputo | G08B 21/24 |
| 2016/0309327 A1* | 10/2016 | Grimault | H04L 63/123 |
| 2016/0327293 A1* | 11/2016 | Grabowski | F24F 11/30 |
| 2017/0075563 A1* | 3/2017 | Bauer | H04M 1/72522 |
| 2017/0310806 A1* | 10/2017 | Zhang | H04M 1/725 |
| 2018/0190056 A1* | 7/2018 | Desinor, Jr. | G07C 9/00896 |
| 2018/0295226 A1* | 10/2018 | Mamdani | G06Q 20/04 |

* cited by examiner

MONITORING AND CONTROLLING THE STATUS OF A COMMUNICATION SESSION

CROSS-REFERENCE TO RELATED APPLICATIONS

This application is a Utility patent application based on a previously filed U.S. Provisional Patent Application U.S. Ser. No. 62/304,871 filed on Mar. 7, 2016, the benefit of the filing date of which is hereby claimed under 35 U.S.C. § 119(e) and which is further incorporated by reference in its entirety.

TECHNICAL FIELD

The present disclosure relates generally to communication sessions enabled by networked computers, and more particular, but not exclusive, to monitoring and controlling the status of a communication session.

BACKGROUND

Networked computers enable users to communicate in real time, or at least near real time. During a communication session, users of networked computer may generate content, such as but not limited to textual, audio, image, and/or video data. The content may be transmitted between network computers employed by the users in near real time, such that the users appear to be interacting and/or communicating with another user in real time. Such computer-enabled communication sessions may include exchanging textual messages, such as online chatting and/or instant messaging (IM).

Furthermore, such communication sessions may include the real time or near real time exchange of audio, image, and/or video data. For instance, many computers now include at least a speaker and a microphone. Networked computers equipped with speakers and microphones enable users to verbally communicate in real time, similar to talking over traditional telephones. Communication sessions that transmit audio content may employ Voice Over Internet Protocols (VOIP), or other such protocols. Networked computers that include a camera, such as but not limited to a webcam or a camera embedded in a smartphone or tablet, enable users to participate in interactive video telephony sessions. Accordingly, users of network computers may participate in online real-time textual, audio, and/or video chat sessions.

The status of such communication sessions may change during the session. For instance, a microphone employed to detect a user's speech may be transitioned from a mute (or off) state to a live (or on) state. Likewise, a camera used to capture image and/or video data may be transitioned between an off state to an on (or alive) state. It is for these and other concerns that the following disclosure is offered.

DETAILED DESCRIPTION OF THE INVENTION

Figure 1:
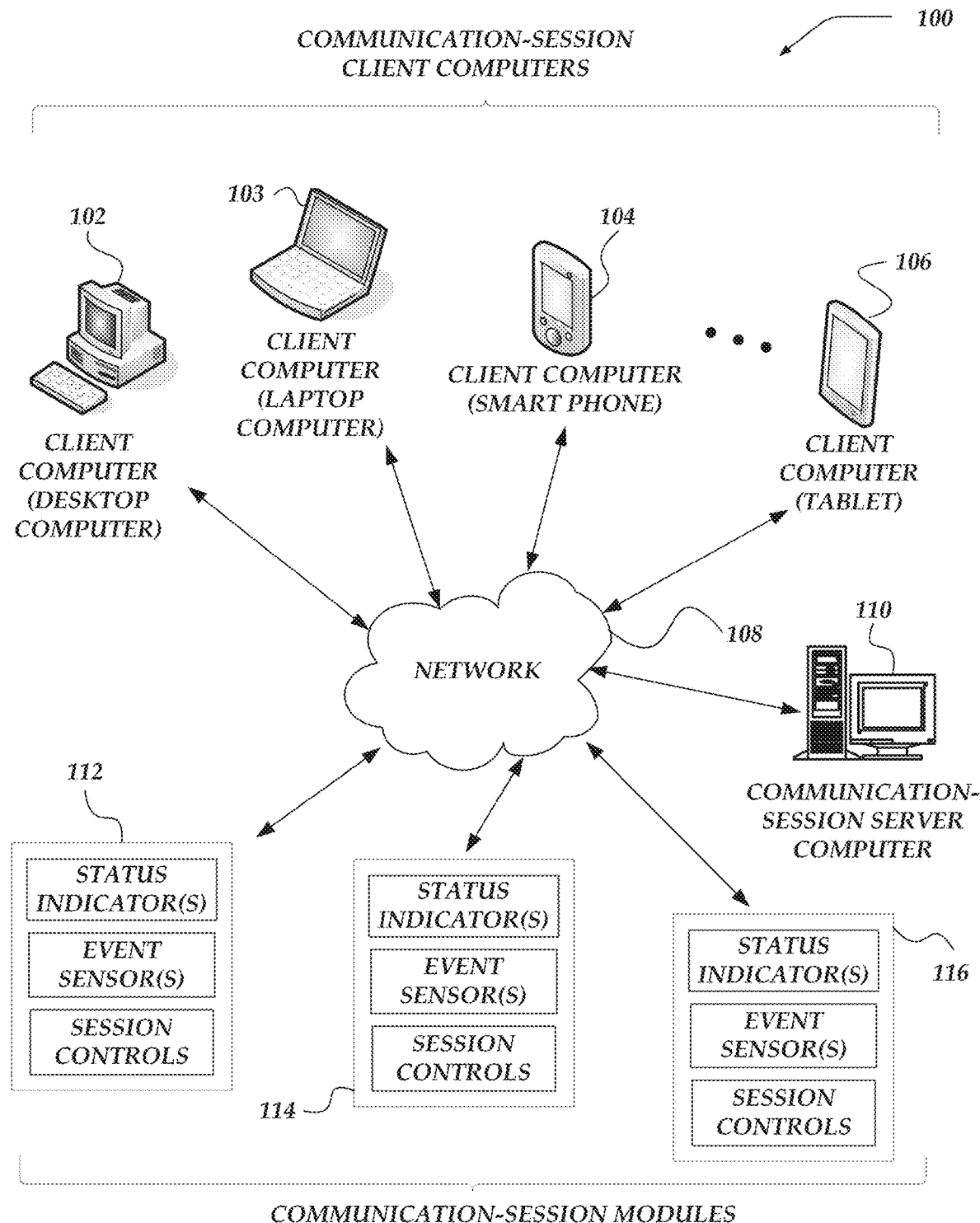
FIG. 1 is a system diagram of an environment in which embodiments of the invention may be implemented.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "communication session" may refer to at least a semi-permanent unidirectional or bidirectional transmission of content, information, and/or data from at least one computer or computer device to at least one other computer or computer device over a communication network. A communication session may be established at a first point in time and terminated at a later point in time. The transmission of content, information, and/or data from at least one computer or computer device to at least one other computer or computer device may include one or more messages exchanged between computers or computer devices in each direction. The one or more computers or computer devices may include any computer device including but not limited to a mobile computer, a network computer, a server computer, a communication-session module, and the like.

A communication session may be a stateful session or a stateless session. A communication session may include an interactive communication-session between the users of the computer devices. Members participating in a communication session may be parties of the communication session. A communication-session may include an interactive chat or messaging session that provides real-time or near real-time communication data to the plurality of users or parties. The real-time communication data may include textual, audio, image, and/or video data. A communication session may include an online textual chat and/or instant messaging (IM). A communication session may include audio and/or video telephony. Accordingly, a communication session may include an online chat session, such as but not limited to an audio chat session and/or a video chat sessions. For instance, a communication session may include an audio conversation between users employing various protocols, methods, and technologies such as Voice Over Internet Protocol (VOIP). A communication session may include audio and or video teleconferencing via commercial products, such as but not limited to SKYPE™, FACETIME™, GOTOMEETING™, HANGOUTS™, and the like.

Thus, various embodiments of a communication session may include two or more parties that are each employing at least one computer to interactively communicate, over a network, by the real time or almost real time transmission of content, information, and/or data. Thus each party of the communication session may be a user of the one or more computers the party is employing to interactively participate in the communication session.

As used herein, the term "textual communication session" may refer to a communication session that enables parties to interactively communicate by the transmission of at least textual content, information, and/or data. For instance, a textual chat or IM session may be a textual communication sessions. As used herein, the term "audio communication session" may refer to a communication session that enables parties to interactively communicate by the transmission of at least audio content, information, and/or data. Thus, an audio chat session that employs VOIP may be an audio communication sessions. As used herein, the term "video communication session" may refer to a communication session that enables parties to interactively communicate by the transmission of at least video content, information, and/or data. Accordingly, a video chat session may be a video communication session.

As used herein, the terms "communication-session status" (CS status) or simply "the status" may refer to a value or state of one or more configuration parameters associated with a particular communication session. A CS status may include a microphone state or a microphone status of a microphone or other audio detecting device associated with a communication session, such as but not limited to a microphone included in or coupled to a computer device within the communication session that is employed to detect audio information, generated by a user of the communication session.

A microphone status (or state) may include the volume level of a microphone employed to detect audio information to transmit during the communication session. In at least one embodiment, a microphone state may include whether the microphone is in a microphone "mute" state or a microphone "live" state. When a particular microphone associated with the communication session is in a mute state, the communication session will at least prevent some other users (or parties of the communication session) from hearing audio information detected only by the microphone in the mute state. In at least one embodiment, the communication session will not transmit audio information detected by a microphone in a mute state. In some embodiments, a microphone mute state may refer to a microphone state that is at the smallest possible volume level and/or the microphone is turned off. Accordingly, a microphone mute state may include a microphone "off" state. In a microphone live state, the communication session will at least partially transmit audio information detected by the corresponding microphone. Accordingly, a microphone live state may refer to a microphone that is on or is in a state that the volume level is larger than the volume level associated with the mute state. Thus a microphone live state may include a microphone "on" state.

A communication-session status may include a camera state or a camera status of a camera or other image detecting device associated with a communication session, such as but not limited to a camera included in or otherwise coupled to the computer device within the communication session that is employed to detect image and/or video information. In at least one embodiment, a camera state (status) may include whether the camera is in an "off" state or a "live" state. When a particular camera associated with the communication session is in an off state, the communication session will at least prevent some other users from seeing image and/or video information detected only by the camera in the off state. In at least one embodiment, the communication session will not transmit image and/or video information detected by the corresponding camera in the off state. In some embodiments, an off state for a camera may refer to a camera state that is turned off. In a live state, the communication session will at least partially transmit image and/or video information detected by the corresponding camera. Accordingly, a camera live state may refer to a camera that is on or is in a state that is on. Thus a camera live state may include a camera "on" state.

Briefly stated a communication-session (CS) module may monitor the status of a communication session and at least partially control the status of the communication session. Various embodiments of CS modules provide a party participating in a communication session one or more status indicators. More particularly, a CS module may provide an indication of whether a status of a microphone that the user is employing to participate in an audio and/or video communication session is in a mute (or off) state, or whether the microphone status is in a live (or on) state. Likewise, a CS module may indicate to a user whether a status of a camera that the user is employing to participate in a video communication session is in an off state, or whether the camera status is in an on (or live) state. As such, various embodiments of CS modules provide users reminders of whether or not the microphone and/or camera, employed to participate in a communication session, is in a live state, a mute state, or is otherwise turned on or off.

Various embodiments of CS modules may be implemented as a standalone physical device that is separate from a computer employed to participate in a communication session. In other embodiments, a CS module may be implemented within a software and/or a firmware module that is in communication with, accessed by, or at least partially executed by a computer employed to participate in the communication session. When a CS module is a physical device that is separate from a computer employed to participate in a communication session, the CS module may be a CS device.

Whether a standalone device or provided via a software enabled user interface (UI), a CS module is operative to actively monitor the status of a communication session and provide one or more corresponding status indicators. The status indicators indicate at least a current status of a microphone and/or a camera employed in the communication session. A CS module may be further operative to at least partially control the current status of the microphone and/or camera. When the CS module is employed to control the CS status, such as but not limited to transitioning a microphone from a mute state to an on state, the status indicators corresponding to the microphone are transitioned to indicate the updated CS status.

A CS device may be a relatively small device powered either by an internal battery, or from an auxiliary source. A user may hand carry the relatively small CS device to a room that is separate from the room housing the computer, microphone, or camera employed to participate in the communication session. While in the other room, the CS device may continue to provide real time status indicators of the CS status.

A CS device may be mounted on a wall, placed on a desk, or carried about while still actively monitoring and controlling the status of the communication session. In at least one embodiment, a CS device includes a coupler or a fastener, such as but not limited to a clip. The inclusion of such a coupler or fastener enables coupling the CS device to a display of the computer employed to participate in the communication session.

Multiple CS modules, physically separated, may provide similar status indicators to multiple users. For example, if a meeting enabled by the communication session is conducted across several rooms, including but not limited to adjacent rooms, a separate CS module within each room may provide similar status indicators to users within each room. In at least one embodiment, multiple CS modules may be communicatively coupled, such as being daisy chained. The number of CS modules that are associated with a particular communication session, computer, microphone, or camera is for all practical purposes unbound.

The one or more status indicators may include one or more audio indicators, one or more visual indicators, one or more haptic indicators, or any combination thereof. The specific combination of indicators types provided by a CS module may be selectable by the user. Visual indicators may include one or more photon emitters included in a CS module. Photon emitters include but are not limited to light emitting diodes (LEDs). The one or more photon emitters indicate the current status of an associated microphone and/or the current status of an associated camera. In at least one embodiment, one or more photon emitters associated with a microphone emits green photons when the microphone status is in an on or live state and emits red photons when the microphone status is in a mute or off state. Similarly, one or more other photon emitters associated with a camera emits green photons when the camera status is in an on or live state and emits red photons when the camera status is in an off state.

Various embodiments of CS modules include one or more audio emitters, such as but not limited to audio speakers. The one or more audio emitters may be operative to provide audio indicators that at least partially indicate the status of the associated communication session. The CS module may provide an audible indicator, indicating the status of the associated one or more microphones and/or cameras. In at least one embodiment, the CS module may provide a human voice that indicates an associated microphone and/or camera status. In an exemplary embodiment, the human voice may announce "MUTE" when the status of the associated microphone is transitioned to or is already in a mute state.

A haptic interface included in a CS module may provide haptic or tactile feedback indicating the CS status of a communication session. For instance, a CS device may vibrate when the status of the associated microphone or camera is transitioned. The user may select whether visual, audio, haptic indicator types, or any combination thereof, are provided by the CS module.

In addition to monitoring of the status of a communication session, various embodiments of a CS module enable at least the partial controlling of the CS status. A CS module may include one or more CS controls to control the status of the associated communication session. For instance, a CS module may include at least one button to transition the status of an associated microphone between a mute state and an on state. Likewise, a CS module may include one or more other buttons to transition a status of an associated camera between an on state and an off state.

When a user of the CS module controls the CS status, the indicators of the CS module are automatically updated to reflect the updated CS status of the communication session. For instance, the photon emitters may transition an operational state and if enabled by the user, the audio emitter may provide an audible indication of the transition of the CS status. In at least one embodiment, an indicator of the transition of the CS status is provided to the associated computer device. For instance, a "pop up" indicator or alert may be provided to a UI displayed on the computer device when a mute button is enabled on the CS module.

A CS module may automatically control at least a portion of the CS status via the detection of one or more trigger events. The trigger events may be audible, visual, and/or environmental trigger events. The CS module may include one or more communication-event (or event) sensors, such as one or more microphones, cameras, proximity sensors, motion sensors, and the like. In various embodiments, the CS module may employ the microphone, cameras, proximity sensors, and motion sensors to detect the audible, visual, and/or environmental trigger events.

Audible trigger events enable controlling the status of a communication session via voice activation by one or more users. A CS module may detect audible trigger events via a user voicing a control keyword or control phrase. Upon detection of a trigger event, the CS module may transition the CS status based on the detected triggering event. For instance, if a user voices the control keyword "MUTE," the CS module will detect the control keyword and automatically transition the associated microphone to a mute state. As such, a CS module may respond to control keywords or phrases, via the detection of one or more audible triggering events.

In addition to a control keyword or phrase, a triggering event may include the detection of a noise level in the room that houses the CS module. When an associated microphone detects or senses a noise level above a predetermined decibel threshold, the CS module may automatically transition the microphone status to a mute state. The decibel threshold may be interactively selectable and/or provided by the user.

In addition to control keywords or phrases, audible trigger events may be associated with forbidden keywords or phrases. For instance, forbidden keywords or phrases may include offensive keywords or phrases. When a forbidden keyword or phrase is detected, the CS module may automatically transition the status of the detecting microphone to a mute state. In at least one embodiment, the CS module may be operative to substitute the forbidden word or phrase with an alternative pre-selected (non-forbidden) keyword or phrase. In this way, the CS module prevents offensive words or phrases from accidental transmission during a communication session. In at least one embodiment, a CS module may be trained, via one or more machine learning methods, to recognize at least control keywords and/or phrases or forbidden keywords and/or phrases.

A CS module may employ various voice or pattern recognition methods to recognize either control and/or forbidden keywords or phrases. A CS module may be trained, via voice or speaker recognition methods, to recognize the voice patterns of particular users. When detecting the voice of a particular user, the CS module may automatically transition the status of the microphone to an on or a muted states. Accordingly, the CS module will prevent the accidental transmission of the voice of particular users when the user prefers that their voice not be transmitted during a communication session.

In addition to detecting audible trigger events, a CS module may detect one or more visual and/or environmental trigger events, via one or more other communication-event sensors, included in or associated with the CS module. Such other event sensors include photon sensors (or cameras), motion sensors (or detectors), proximity sensors, open-air gesture interfaces, and the like. For instance, a CS module may detect a level of light in the room that houses the CS module, via one or more cameras. If the light level is below a luminosity threshold, the status of an associated camera may be transitioned to an off state. Similarly, one or more cameras (such as an infrared camera) may detect or sense a number of users within a room housing the CS module or the CS client computer. If the number of user is less than a user-selectable participant threshold, the CS module may automatically transition one or more associated cameras to the off state.

A triggering event may include determining when a distance between a CS module and one or more users either is less than or greater than a distance threshold. The distance threshold may be a predetermined threshold, or selectably provided by a user. Some embodiments may include a safe mode. When operated in the safe mode, a CS device employs one or more proximity sensors to determine a proximate distance between the CS module and one or more users. When the one or more proximity sensors determines the distance between the one or more users to be greater than a threshold distance, the CS module may provide an indication that the communication session is still live and has not been terminated. The indication may be a warning, such as a visual or audible indication. For instance, one or more of the photon emitters of the CS module may flash and/or the audio emitter of the CS module may provide a tone or beep to warn the user, even though the user may not be looking at a display of the device that is employed in the communication session. In this way, the safe mode provides a warning to the user, so that the user does not walk away from the CS module and think that the communication session has terminated, when the communication session has not been terminated. Each triggering event, including audible, environmental, and/or visual triggering events, may be completely configurable via a user.

Illustrated Operating Environment

FIG. 1 shows components of one embodiment of an environment in which various embodiments of the invention may be practiced. Not all of the components may be required to practice the various embodiments, and variations in the arrangement and type of the components may be made without departing from the spirit or scope of the invention. As shown, system 100 of FIG. 1 may include communication-session (CS) server computer 110, communication-session (CS) client computers 102-106, communication-session (CS) modules 112-116, and network 108.

Various embodiments of CS server computer 110 are described in more detail below in conjunction with network computer 300 of FIG. 3. At least one embodiment of CS server computer 110 is described in conjunction with mobile computer 200 of FIG. 2. Briefly, in some embodiments, CS server computer 110 may be operative to enable one or more communication sessions between one or more CS client computers 102-106. In at least one embodiment, CS server computer may include a communication-session (CS) server, such as but not limited to CS server 322 of network computer 300 of FIG. 3. A CS server may be implemented in hardware, software, firmware, or a combination thereof. A CS server may serve one or more communication-session clients, such as but not limited to CS client 222 of mobile computer 200 of FIG. 2. For instance, a CS client may server a CS request provided by one or more CS client computers 102-106. Accordingly, CS server computer 110 may be operative to communicate, via network 108, with CS client computers 102-106 to enable a user of CS client computers 102-106 to participate in one or more interactive communication-sessions with other users of CS client computers 102-106 via network 108.

Various embodiments of CS client computers 102-106 are described in more detail below in conjunction with mobile computer 200 of FIG. 2. Furthermore, at least one embodiment of CS client computers 102-106 is described in more detail in conjunction with network computer 300 of FIG. 3. Briefly, in some embodiments, CS client computers 102-106 may be operative to provide, transmit, receive, or otherwise exchange information or data with one or more other CS client computers within a communication-session. In at least one embodiment, CS client computer may include a communication-session (CS) client, such as but not limited to CS client 222 of mobile computer 200 of FIG. 2. A CS client may be implemented in hardware, software, firmware, or a combination thereof. A CS client may be a client of one or more communication-session servers, such as but not limited to CS server 322 of mobile computer 300 of FIG. 3. For instance, a CS client may provide request, information, or data to be exchanged with other CS clients via a CS server. Accordingly, a CS client computer 102-106 may be operative to communicate with other CS client computers to enable a user of CS client computers 102-106 to participate in one or more interactive communication-sessions with other users of CS client computers 102-106 via network 108.

Various embodiments of communication-session (CS) modules 112-116 are described in more detail below in conjunction with FIGS. 4-5B. Briefly, in some embodiments, at least one of the CS modules 112-116 may be at least partially implemented in a hardware device, such as but not limited to communication-session (CS) device 500 of FIG. 5A. Accordingly, in some embodiments, at least one of CS modules 112-116 may be included in a device that is separate from each of CS client computers 102-106 and separate from CS server computer 110. In some embodiments, at least one of the CS modules 112-116 may be at least be partially implemented in software and/or firmware, such as but not limited to CS module 550 of FIG. 5B. In at least one embodiment, a CS module may be implemented via a combination of hardware, software, and/or firmware. Accordingly, in some embodiments, at least one of CS modules 112-116 may be included in at least one of CS client computers 102-106 or CS server computer 110. Briefly, as discussed in conjunction with the various embodiments described herein, a CS module may be operative to at least partially monitor, control, and provide the communication-session (CS) status of one or more communication sessions. As discussed in further detail below, a CS module may communicate, via network 108, with at least a CS client computer, a CS server computer, or another CS module to at least partially monitor and control the CS status of one or more communication sessions. The CS status may be provided to one or more users of the communication session.

Network 108 may include virtually any wired and/or wireless technology for communicating with a remote device, such as, but not limited to, USB cable, Bluetooth, Wi-Fi, or the like. In some embodiments, network 108 may be a network configured to couple network computers with other computing devices, including reviewing computers 102-105, network computers 112, and the like. In at least one of various embodiments, sensors may be coupled to network computers via network 108, which is not illustrated in FIG. 1. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or any combination thereof. In various embodiments, the network may be enabled to employ various forms of communication technology, topology, computer-readable media, or the like, for communicating information from one electronic device to another. For example, the network can include—in addition to the Internet—LANs, WANs, Personal Area Networks (PANs), Campus Area Networks, Metropolitan Area Networks (MANs), direct communication connections (such as through a universal serial bus (USB) port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, the network may include any communication technology by which information may travel between computing devices.

The network may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least CS client computer 102-106, CS modules 112-116, CS server computer 110, and the like. Such sub-networks may include mesh networks, Wireless LAN (WLAN) networks, cellular networks, or the like. In at least one of the various embodiments, the system may include more than one wireless network.

The network may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), or any of a variety of other communication protocols and/or technologies. In essence, the network may include communication technologies by which information may travel between CS client computers 102-106, CS modules computers 112-116, CS server computer 110, other computing devices not illustrated, other networks, and the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self organize based on current operating conditions and/or rule-based policies, such that the network topology of the network may be modified.

Illustrative Mobile Computer

Figure 2:
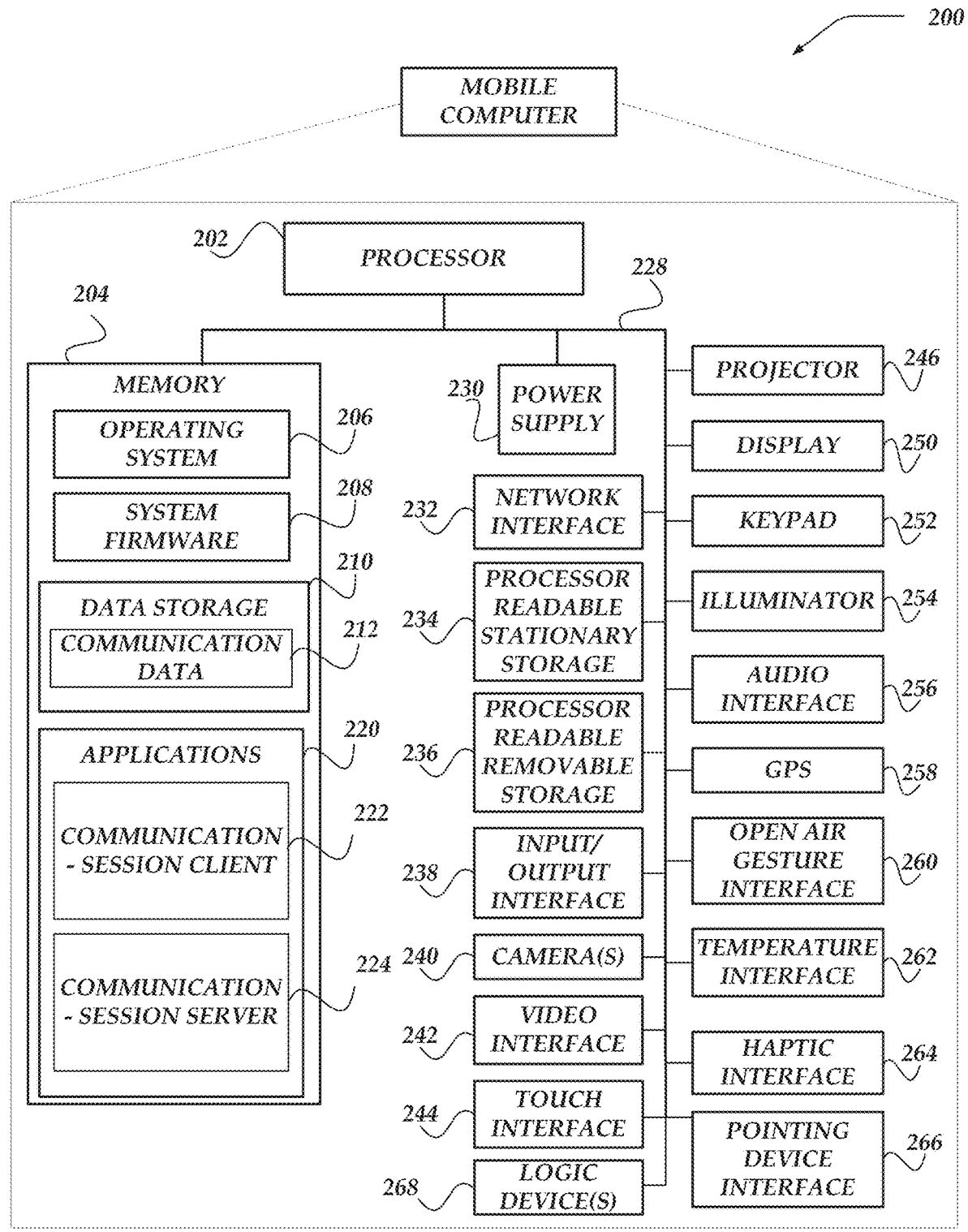
FIG. 2 shows an embodiment of a client computer that may be included in a system such as that shown in FIG. 1.

FIG. 2 shows one embodiment of mobile computer 200 that may include many more or less components than those shown. Mobile computer 200 may represent, for example, at least one embodiment of CS client computers 102-106, CS server computer 110, or at least one of CS modules 112-116 of system 100 of FIG. 1. So, mobile computer 200 may be a mobile device (e.g., a smart phone or tablet), a stationary/desktop computer, a client computer, a server computer, a CS module, or the like.

Mobile computer 200 may include processor 202, such as a central processing unit (CPU), in communication with memory 204 via bus 228. Mobile computer 200 may also include power supply 230, network interface 232, processor-readable stationary storage device 234, processor-readable removable storage device 236, input/output interface 238, camera(s) 240, video interface 242, touch interface 244, projector 246, display 250, keypad 252, illuminator 254, audio interface 256, global positioning systems (GPS) receiver 258, open air gesture interface 260, temperature interface 262, haptic interface 264, pointing device interface 266, or the like. Mobile computer 200 may optionally communicate with a base station (not shown), or directly with another computer. And in one embodiment, although not shown, an accelerometer or gyroscope may be employed within mobile computer 200 to measuring and/or maintaining an orientation of mobile computer 200.

Additionally, in one or more embodiments, the mobile computer 200 may include logic circuitry 268. Logic circuitry 268 may be an embedded logic hardware device in contrast to or in complement to processor 202. The embedded logic hardware device would directly execute its embedded logic to perform actions, e.g., an Application Specific Integrated Circuit (ASIC), Field Programmable Gate Array (FPGA), and the like.

Also, in one or more embodiments (not shown in the figures), the mobile computer may include a hardware microcontroller instead of a CPU. In at least one embodiment, the microcontroller would directly execute its own embedded logic to perform actions and access it's own internal memory and it's own external Input and Output Interfaces (e.g., hardware pins and/or wireless transceivers) to perform actions, such as System On a Chip (SOC), and the like.

Power supply 230 may provide power to mobile computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling mobile computer 200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of mobile computer 200, e.g., using voice recognition, detecting touch based on sound, and the like. A microphone may be used to capture audio content, information, or data transmitted in a communication session. A speaker may be operative to provide transmitted audio content within a communication session.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures. A speaker may be operative to provide transmitted image and/or video content within a communication session.

Projector 246 may be a remote handheld projector or an integrated projector that is capable of projecting an image on a remote wall or any other reflective object such as a remote screen. Projector 246 may be operative to provide transmitted image and/or video content within a communication session.

Video interface 242 may be arranged to capture video images, such as a still photo, a video segment, an infrared video, or the like. For example, video interface 242 may be coupled to a digital video camera, a web-camera, or the like, such as but not limited to cameras 240. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the mobile device is powered. Also, illuminator 254 may backlight these buttons in various patterns when particular actions are performed, such as dialing another mobile computer. Illuminator 254 may also cause light sources positioned within a transparent or translucent case of the mobile device to illuminate in response to actions.

Mobile computer 200 may also comprise input/output interface 238 for communicating with external peripheral devices or other computers such as other mobile computers and network computers. Input/output interface 238 may enable mobile computer 200 to communicate with one or more servers. In some embodiments, input/output interface 238 may enable mobile computer 200 to connect and communicate with one or more other computers, such as but not limited to other CS client computers 102-106, CS server computer 110, CS modules 112-116, and the of FIG. 1. Other peripheral devices that mobile computer 200 may communicate with may include remote speakers and/or microphones, headphones, display screen glasses, or the like. Input/output interface 238 can utilize one or more technologies, such as Universal Serial Bus (USB), Infrared, Wi-Fi, WiMax, BLUETOOTH™, ZIGBEE™, wired technologies, or the like.

Haptic interface 264 may be arranged to provide tactile feedback to a user of a mobile computer 200. For example, the haptic interface 264 may be employed to vibrate mobile computer 200 in a particular way when another user of a computer is calling. Temperature interface 262 may be used to provide a temperature measurement input and/or a temperature changing output to a user of mobile computer 200. Open air gesture interface 260 may sense physical gestures of a user of mobile computer 200, for example, by using single or stereo video cameras, radar, a gyroscopic sensor inside a computer held or worn by the user, or the like. Camera 240 may be used to track physical eye movements of a user of mobile computer 200. Camera 240 may be used to capture image and/or image content or data to transmit in a communication session.

GPS transceiver 258 can determine the physical coordinates of mobile computer 200 on the surface of the Earth, which typically outputs a location as latitude and longitude values. Physical coordinates of a mobile computer that includes a GPS transceiver may be referred to as geo-location data. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile computer 200 on the surface of the Earth. It is understood that under different conditions, GPS transceiver 258 can determine a physical location for mobile computer 200. In at least one embodiment, however, mobile computer 200 may, through other components, provide other information that may be employed to determine a physical location of the mobile computer, including for example, a Media Access Control (MAC) address, IP address, and the like. In at least one embodiment, GPS transceiver 258 is employed for localization of the various embodiments discussed herein. For instance, the various embodiments may be localized, via GPS transceiver 258, to customize the linguistics, technical parameters, time zones, configuration parameters, units of measurement, monetary units, and the like based on the location of a user of mobile computer 200.

Human interface components can be peripheral devices that are physically separate from mobile computer 200, allowing for remote input and/or output to mobile computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A mobile computer 200 may include a browser application that is configured to receive and to send web pages, web-based messages, graphics, text, multimedia, and the like. Mobile computer's 200 browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

In various embodiments, the browser application may be configured to enable a user to log into an account and/or user interface to access/view content data. In at least one of various embodiments, the browser may enable a communication session.

Memory 204 may include RAM, ROM, and/or other types of memory. Memory 204 illustrates an example of computer-readable storage media (devices) for storage of information such as computer-readable instructions, data structures, program modules or other data. Memory 204 may store system firmware 208 (e.g., BIOS) for controlling low-level operation of mobile computer 200. The memory may also store operating system 206 for controlling the operation of mobile computer 200. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by mobile computer 200 to store, among other things, applications 220 and/or other data. For example, data storage 210 may store communication data 212 generated, transmitted, provided, or the like within a communication session. Data storage 210 may further include program code, data, algorithms, and the like, for use by a processor or logic circuitry, such as processor 202 to execute and perform actions. In one embodiment, at least some of data storage 210 might also be stored on another component of mobile computer 200, including, but not limited to, non-transitory processor-readable removable storage device 236, processor-readable stationary storage device 234, or even external to the mobile device. Removable storage device 236 may be a USB drive, USB thumb drive, dongle, or the like.

Applications 220 may include computer executable instructions which, when executed by mobile computer 200, transmit, receive, and/or otherwise process instructions and data. Applications 220 may include at least one of communication-session (CS) client 222 or CS server 224. CS client 222 and/or CS server 224 may enable one or more communication sessions. Other examples of application programs that may be included in applications 220 include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

So, in some embodiments, mobile computer 200 may be enabled to employ various embodiments, combinations of embodiments, processes, or parts of processes, as described herein. Moreover, in various embodiments, mobile computer 200 may be enabled to employ various embodiments described above in conjunction with FIG. 1.

Illustrative Network Computer

Figure 3:
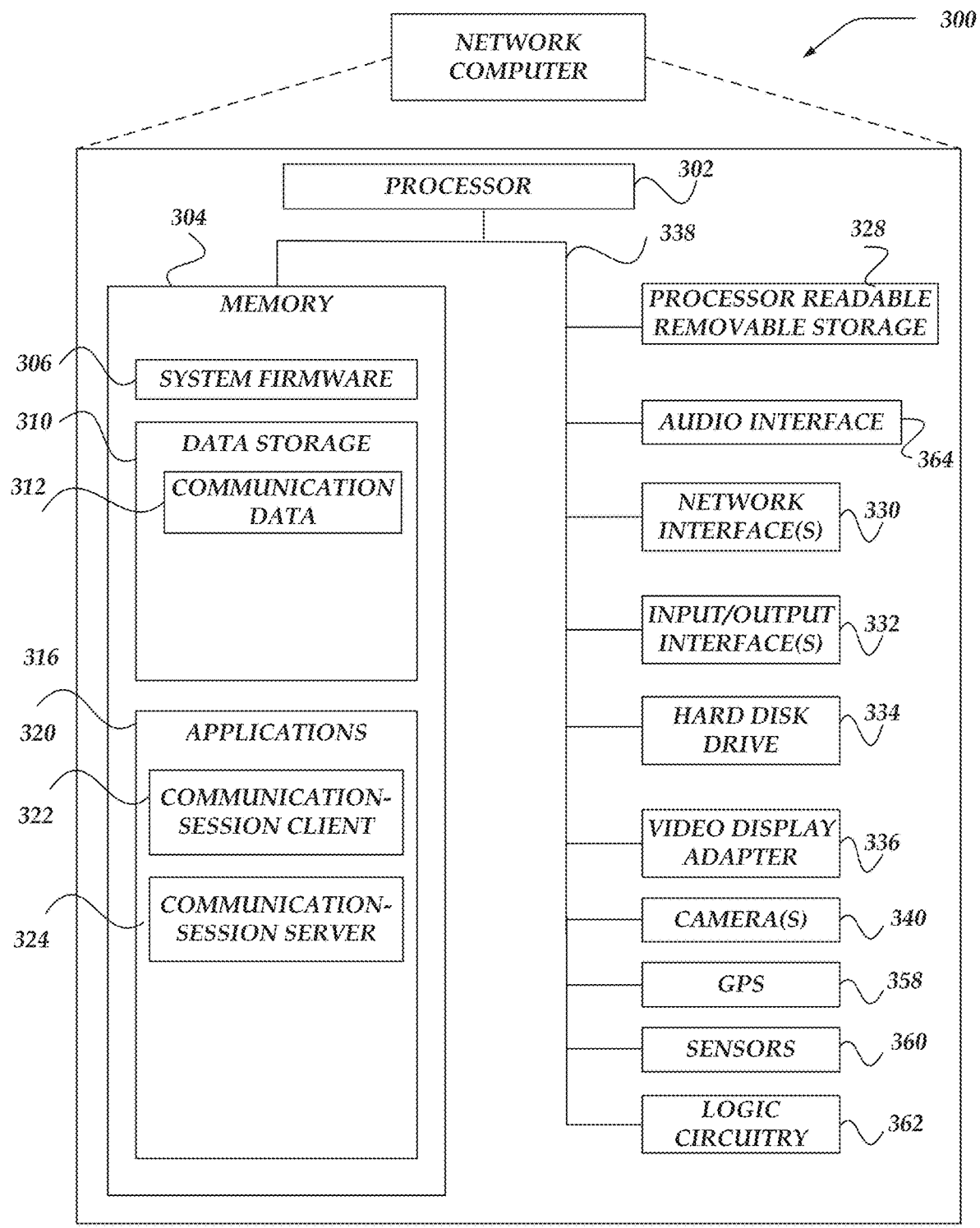
FIG. 3 illustrates an embodiment of a network computer that may be included in a system such as that shown in FIG. 1.

FIG. 3 shows one embodiment of network computer 300, according to one embodiment of the invention. Network computer 300 may represent, for example, at least one embodiment of CS client computers 102-106, CS server computer 110, CS modules 112-116, and the like. Network computer 300 may be a desktop computer, a laptop computer, a server computer, a client computer, a CS module, and the like.

Network computer 300 may include processor 302, such as a CPU, processor readable storage media 328, network interface unit 330, an input/output interface 332, hard disk drive 334, video display adapter 336, GPS 338, and memory 304, all in communication with each other via bus 338. In some embodiments, processor 302 may include one or more central processing units.

Additionally, in one or more embodiments (not shown in the figures), the network computer may include an embedded logic hardware device instead of a CPU. The embedded logic hardware device would directly execute its embedded logic to perform actions, e.g., an Application Specific Integrated Circuit (ASIC), Field Programmable Gate Array (FPGA), and the like.

Also, in one or more embodiments (not shown in the figures), the network computer may include a hardware microcontroller instead of a CPU. In at least one embodiment, the microcontroller would directly execute its own embedded logic to perform actions and access it's own internal memory and it's own external Input and Output Interfaces (e.g., hardware pins and/or wireless transceivers) to perform actions, such as System On a Chip (SOC), and the like.

As illustrated in FIG. 3, network computer 300 also can communicate with the Internet, cellular networks, or some other communications network (either wired or wireless), via network interface unit 330, which is constructed for use with various communication protocols. Network interface unit 330 is sometimes known as a transceiver, transceiving device, or network interface card (NIC). In some embodiments, network computer 300 may communicate with a documenting computer, reviewing computer, or a computer included in an ATP platform, or any other network computer, via the network interface unit 320.

Network computer 300 also comprises input/output interface 332 for communicating with external devices, such as a various sensors or other input or output devices not shown in FIG. 3. Input/output interface 332 can utilize one or more communication technologies, such as USB, infrared, Bluetooth™, or the like.

Memory 304 generally includes RAM, ROM and one or more permanent mass storage devices, such as hard disk drive 334, tape drive, optical drive, and/or floppy disk drive. Memory 304 may store system firmware 306 for controlling the low-level operation of network computer 300 (e.g., BIOS). In some embodiments, memory 304 may also store an operating system for controlling the operation of network computer 300.

Although illustrated separately, memory 304 may include processor readable storage media 328. Processor readable storage media 328 may be referred to and/or include computer readable media, computer readable storage media, and/or processor readable storage device. Processor readable removable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 304 further includes one or more data storage 310, which can be utilized by network computer 300 to store, among other things, communication data 312 and/or other data. For example, data storage 310 may further include program code, data, algorithms, and the like, for use by a processor, such as processor 302 to execute and perform actions. In one embodiment, at least some of data storage 310 might also be stored on another component of network computer 300, including, but not limited to processor-readable storage media 328, hard disk drive 334, or the like.

Applications 320 may include computer executable instructions that can execute on processor 302 to perform actions. In some embodiments, one or more of applications 320 may be part of an application that may be loaded into mass memory and run on an operating system Applications 320 may include at least one of communication-session (CS) client 322 or CS server 324. A CS server 324 may serve one or more CS clients, such as but not limited to CS client 322 or 222 of mobile computer 200 of FIG. 2. For instance, a CS client may server a CS request provided by one or more CS client computers 102-106.

GPS transceiver 358 can determine the physical coordinates of network computer 300 on the surface of the Earth, which typically outputs a location as latitude and longitude values. Physical coordinates of a network computer that includes a GPS transceiver may be referred to as geo-location data. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 358 can determine a physical location for network computer 300. In at least one embodiment, however, network computer 300 may, through other components, provide other information that may be employed to determine a physical location of the mobile computer, including for example, a Media Access Control (MAC) address, IP address, and the like. In at least one embodiment, GPS transceiver 358 is employed for localization of the various embodiments discussed herein. For instance, the various embodiments may be localized, via GPS transceiver 258, to customize the linguistics, technical parameters, time zones, configuration parameters, units of measurement, monetary units, and the like based on the location of a user of mobile computer 200.

User interface 324 may enable the user to provide the collection, storage, and transmission customizations described herein. In some embodiments, user interface 324 may enable a user to view to communication data in real-time or near-real time with the network computer.

Audio interface 364 may be arranged to produce and receive audio signals such as the sound of a human voice. For example, audio interface 354 may be coupled to a speaker and microphone (not shown) to enable communication sessions with others and/or generate an audio acknowledgement for some action. A microphone in audio interface 364 can also be used for input to or control of network computer 300, e.g., using voice recognition, detecting touch based on sound, and the like. A microphone may be used to capture audio content, information, and/or data for transmission within a communication session. Likewise, camera 340 may be used to capture image and/or video content, information, and/or data for transmission within a communication session. Other sensors 360 may be included to sense a location, or other environment component.

Additionally, in one or more embodiments, the network computer 300 may include logic circuitry 362. Logic circuitry 362 may be an embedded logic hardware device in contrast to or in complement to processor 302. The embedded logic hardware device would directly execute its embedded logic to perform actions, e.g., an Application Specific Integrated Circuit (ASIC), Field Programmable Gate Array (FPGA), and the like.

So, in some embodiments, network computer 300 may be enabled to employ various embodiments, combinations of embodiments, processes, or parts of processes, as described herein. Moreover, in various embodiments, network computer 300 may be enabled to employ various embodiments described above in conjunction with computer device of FIG. 1.

Illustrative Communication-Session Module

Figure 4:
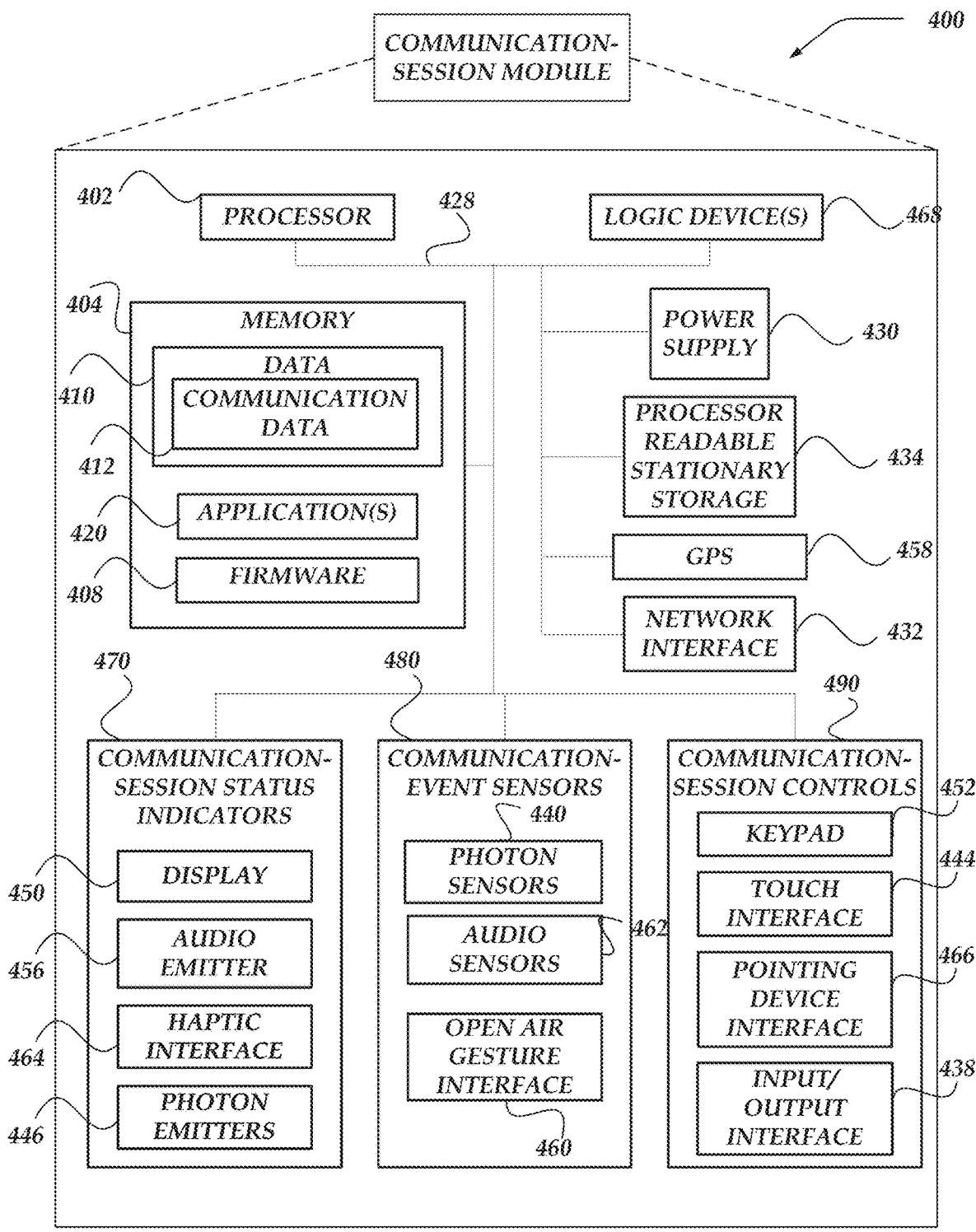
FIG. 4 illustrates an embodiment of a communication-session module that may be included in a system such as that shown in FIG. 1.
Figure 5A:
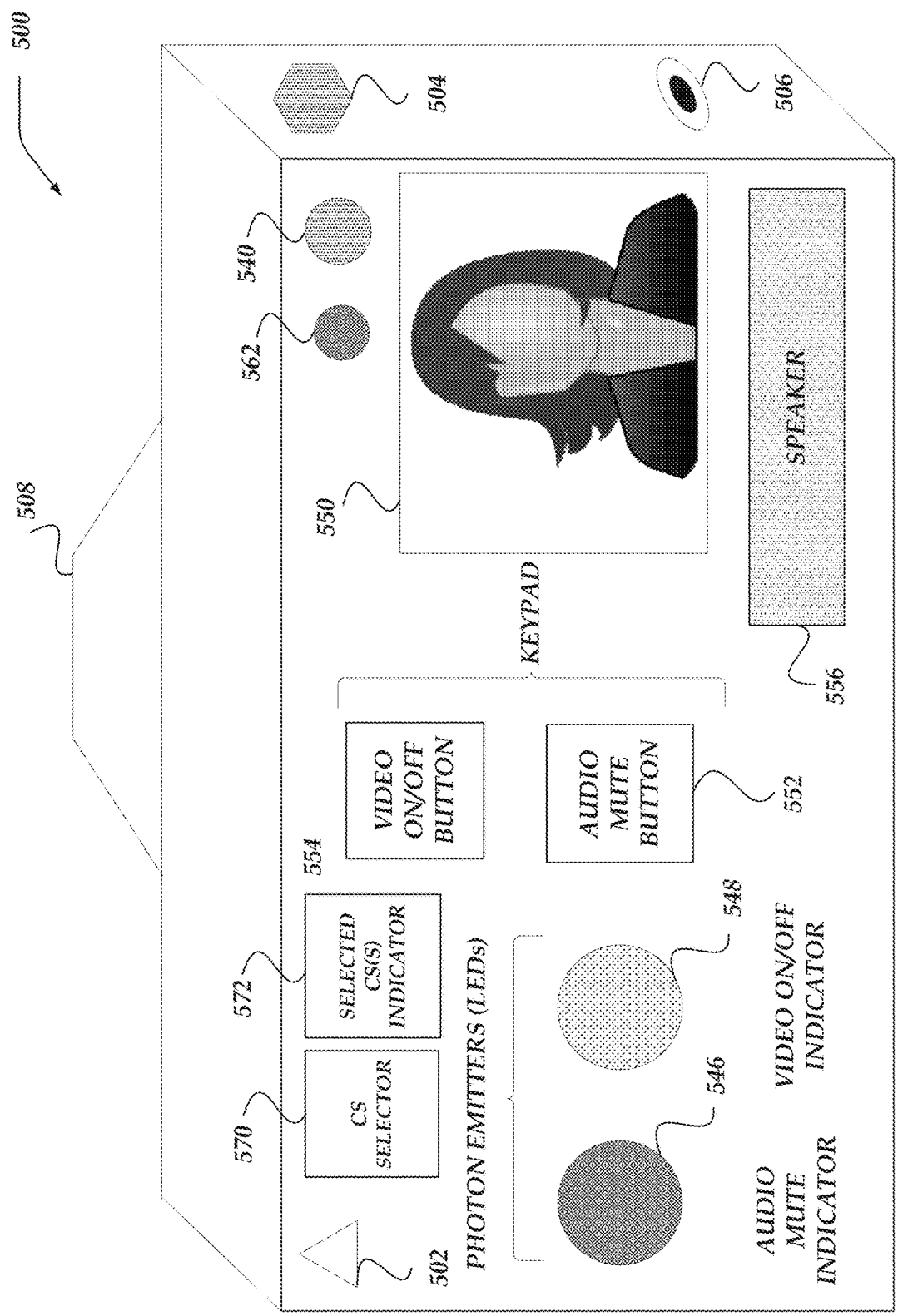
FIG. 5A illustrates another embodiment of a communication-session module that may be included in a system such as that shown in FIG. 1.
Figure 5B:
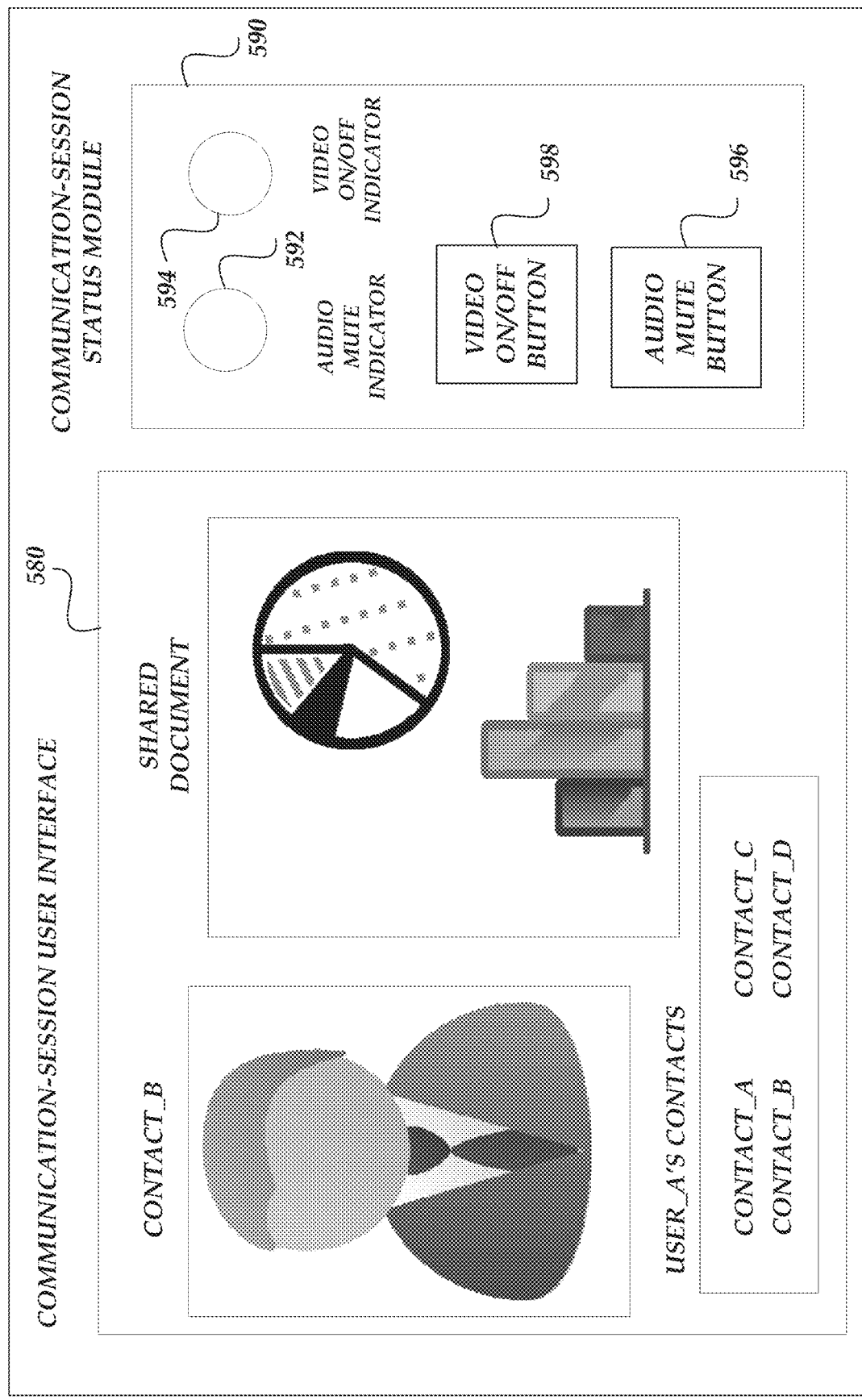
FIG. 5B illustrates another embodiment of a communication-session module that may be included in a system such as that shown in FIG. 1.

The following discussion refers to FIGS. 4, 5A, and 5B. FIG. 4 illustrates an embodiment of a communication-session (CS) module 400 that may be included in a system such as that shown in FIG. 1. FIG. 5A illustrates another embodiment of a CS module 500 that may be included in a system such as that shown in FIG. 1. FIG. 5B illustrates yet another embodiment of a CS module 590 that may be included in a system such as that shown in FIG. 1. Any of CS modules 400, 500, and 590 of FIGS. 4-5B may represent, at least one embodiment of CS modules 112-116 of system 100 of FIG. 1. A CS module may be in communication with, communicatively coupled to, and/or paired with a computer or another CS module that is employed to participate in a communication session. For instance, any of CS modules 400/500/590 may be communicatively coupled with a computer, such as but not limited to any of CS client computers 102-106 or CS server computer 110, as well as another CS module via one or more communication networks, such as but not limited to network 108 of FIG. 1.

Various embodiments of CS modules may be implemented as a standalone physical device that is separate from a computer employed to participate in a communication session. CS module 500 of FIG. 5A is one embodiment of a physical device that is separate from a computer employed to participate in a communication session. In at least one embodiment, a CS module may be a peripheral device of a computer employed to participate in a communication session. When a CS module is a physical device that is separate from, or a peripheral device of, a computer employed to participate in a communication session, the CS module may be a CS device. CS module 500 of FIG. 5A is one embodiment of a CS device. A CS device may wirelessly or via a wire, communicate with one or more computers or other CS modules associated with the communication session.

In other embodiments, a CS module may be implemented within a software and/or a firmware module that is in communication with, accessed by, or at least partially executed by a computer employed to participate in, or is otherwise associated with, a communication session. In at least one embodiment, a CS module may be at least partially executed via one or more CS client computers or one or more CS server computers that may facilitate the communication session. Various embodiments of CS modules are implemented via a combination of hardware, software, and/or firmware.

CS module 590 of FIG. 5B is one embodiment of a software implemented CS module that is in communication with, accessed by, or at least partially executed by a computer such as but not limited to a CS client computer or a CS server computer. CS module 590 is provided to the via a user interface (UI) in a display that also includes a UI for the communication session 580.

Generally, a CS module may monitor the status of a communication session and at least partially control the status of the communication session. Various embodiments of CS modules provide a party participating in a communication session one or more status indicators. The status indicators indicate at least a partial communication-session (CS) status (of the communication session). In various embodiments, a CS status may include at least one of a status of a microphone status (of a microphone) or a camera status (of a camera). The microphone and/or the camera may be selectively and/or dynamically associated with the CS module. The associated microphone and/or camera may be employed by a user to participate in the communication session. In some embodiments, at least one of the microphone or camera may be included in a CS client computer employed to participate in the communication session. In at least one embodiment, the user employing at least one of the microphone, camera, and/or CS client computer is a user of the CS module.

More specifically, a CS module may provide an indication of whether a status of a microphone that the user is employing to participate in an audio and/or video communication session is in a mute (or off) state, or whether the microphone status is in a live (or on) state. In various embodiments, the microphone status includes additional states of the microphone, such as but not limited to volume level. Likewise, a CS module may indicate to a user whether a status of a camera that the user is employing to participate in a video communication session is in an off state, or whether the camera status is in an on (or live) state. The camera status may include one or more additional states of the camera. As such, various embodiments of CS modules provide users reminders of whether or not the microphone and/or camera, employed to participate in a communication session, is in a live state, a mute state, or is otherwise turned on or off.

In some embodiments, a CS module is associated with a communication session. When associated with a communication session, the CS module may be further associated with one or more specific computers, microphones, and/or cameras employed to participate in the communication session. A CS module may be associated with one or more users of the associated computer, microphone, and/or camera. In some embodiments, a CS module may be associated with one or more other CS modules. When associated with a specific computer, microphone, camera, or other CS modules, a CS module may be operative to communicate with the associated computer, microphone, camera, or other CS modules. Accordingly, when associated with a specific computer, microphone, camera, or other CS modules, the CS module and the associated computer/microphone/camera/ other CS module may be communicatively paired.

Additionally, when associated with a specific computer, microphone, camera, or other CS modules, a CS module may be operative to actively monitor the status of a communication session and provide one or more status indicators that indicate a current status of the computer, microphone, camera, or other CS module. As discussed further below, the CS module may be operative to at least partially control the status of the computer, microphone, camera, or other CS module. When the CS module is employed to control the CS status, such as but not limited to transitioning a microphone from a mute state to an on state, status indicators included in the CS module and corresponding to the associated microphone, are transitioned to indicate the updated CS status.

A CS device, such as CS module 500 of FIG. 5A, may be a relatively small device that is powered either by an internal battery, or from an auxiliary source, such as being tethered to an associated computer via a Universal Serial Bus (USB), or the like. The battery may be a rechargeable battery and/or a replaceable battery. CS module 500 includes a power port 506 to provide auxiliary power, recharge the internal battery, provided wired communication to another device, or otherwise communicatively couple or associate CS module 500 with another device. Power port 506 may be a USB port. CS module 500 may additionally include a battery status indicator 502 that indicates a current charge level of the internal battery.

When communicating with an associated computer, microphone, camera, other CS module, or the like, one or more wired protocols, such as but not limited to USB protocols, or one or more wireless protocols, such as but not limited to BLUETOOTH™ or WIFI™ protocols, may be employed. CS module 500 may include a communication status indicator 504. Communication status indicator 504 indicates whether CS module 500 is currently associated with, or otherwise communicatively coupled with another device.

Accordingly, a CS device, such as but not limited to CS module 500, may be employed as a wired or wireless device. As a wireless device, a CS module 500 may be carried from room to room, or otherwise mobile while still in communication with other devices. A user may hand carry the relatively small CS module 500 to a room that is separate from the room housing the associated computer, microphone, camera, or the like. While in the other room, the wireless CS module 500 may continue to provide real time status indicators of the CS status.

A CS device may be mounted on a wall, placed on a desk, or carried about while still in communication with other devices, and the like. In at least one embodiment, CS module 500 includes a coupler 508 or a fastener, such as but not limited to a clip. The inclusion of coupler 508 enables coupling CS module 500 to a display of an associated computer, such as a display for client computers 102 or 104 of system 100 of FIG. 1, for easy viewing of at least the status indicators.

Multiple CS modules, physically separated, may provide similar status indicators to multiple users. For example, if a meeting enabled by the communication session is conducted across several rooms, including but not limited to adjacent rooms, a separate CS module within each room may provide similar status indicators to users within each room. In at least one embodiment, multiple CS modules may be communicatively coupled, such as being daisy chained. In at least one embodiment, a plurality of CS modules may be communicatively paired. The number of CS modules that are associated with a particular communication session, computer, microphone, camera, user, or the like is for all practical purposes unbound.

As discussed herein, a CS module may monitor the status of a communication session and provide one or more status indicators that indicate the current CS status to a user. The one or more status indicators may include one or more audio indicators, one or more visual indicators, one or more haptic indicators, or any combination thereof. The specific combination of indicator types provided by a CS module may be selectable by a user.

Visual indicators may include one or more photon emitters included in a CS module. Photon emitters include but are not limited to light emitting diodes (LEDs). The one or more photon emitters indicate the current status of an associated microphone and/or the current status of an associated camera. A characteristic of the one or more LEDs may be modulated, transitioned, or otherwise controlled to indicate the current status of the associated microphone or camera. Such LED characteristics may include but are not otherwise limited to color and/or intensity. A mode of the LED may be controlled, such as whether the LED is in an on or off state, or whether the LED is constantly emitting photons, or is in a blinking or pulsing mode to indicate the current status of the associated microphone or camera.

In at least one embodiment, one or more photon emitters associated with a microphone emits green photons when the microphone status is in an on or live state and emits red photons when the microphone status is in a mute or off state. For instance, CS module 500 of FIG. 5A includes one or more microphone LEDs 546 corresponding the status of one or more microphones. Similarly, one or more other photon emitters associated with a camera emits green photons when the camera status is in an on or live state and emits red photons when the camera status is in an off state. CS module 500 includes one or more camera LEDs 548 corresponding the status of one or more cameras.

A software implemented CS module, such as but not limited to CS module 590 of FIG. 5B, may employ virtual photon emitters. The virtual photon emitters may include virtual lights, LEDS, or other status indicators within a user interface (UI) provided by the CS module and displayed on a display of a computer, such as but not limited to a CS client computer employed by the user. For instance, CS module 590 includes virtual microphone LED 592 and virtual camera LED 594 to indicate the status of the corresponding microprobe and camera. The one or more photon emitters associated with the one or more microphones may be separate from the one or more photon emitters associated with the one or more cameras.

Various embodiments of CS modules include one or more audio emitters, such as but not limited to audio speakers. For instance, CS module 500 of FIG. 5A includes speaker 556. The one or more audio emitters may be operative to provide audio indicators that at least partially indicate the status of the associated communication session. The CS module may provide an audible indicator such as one or more tones, via the audio emitter, indicating the status of the associated one or more microphones and/or cameras. In at least one embodiment, the CS module may provide a human voice that indicates an associated microphone and/or camera status. In an exemplary embodiment, the human voice may announce "MUTE" when the status of the associated microphone is transitioned to or is already in a mute state. Similarly, the human voice may announce, "LIVE" when the microphone is transitioned to or is already in an on or live state.

The audio indicator of the current CS status may be provided when the CS status is transitioned and/or at predetermined frequencies. The predetermined frequencies may be user-selectable frequencies. For instance, a CS module may provide an audio indicator of a microphone's current state every 5 minutes, or any other interval. In at least one embodiment, a user may be enabled to interactively provide and/or select the predetermined frequency of one or more audio indicators.

A haptic interface included in a CS module may provide haptic or tactile feedback indicating the CS status of a communication session. For instance, a CS device may vibrate when the status of the associated microphone or camera is transitioned. A user-selectable frequency for providing the one or more haptic indicators may be employed in a similar fashion to the frequency discussed above for providing audio indicators to the user. The user may select whether visual, audio, haptic indicator types, or any combination thereof, are provided by the CS module. For instance, the user may select whether to provide only indicators via the photon emitters, or whether to also provide audio and/or haptic indicators as well to indicate the CS status, or any combination thereof.

As discussed herein, a CS module may monitor and control the status of one or more communication sessions. As such, a CS module, such as but not limited to CS module 500 of FIG. 5A may include a CS selector 570 that enables the user to actively select one or more communication sessions to monitor and control the status of amongst a plurality of available communication sessions that the user may be participating in, or at least observing. For instance, a user may have a plurality of communications session windows open on one or more CS client computers. CS module 500 may additionally include selected CS(s) indicator 572 that indicates, or displays, which amongst the plurality of available communication sessions that the CS module 500 is actively monitoring and controlling the status of. Furthermore, selected CS(s) indicator 572 may indicate, or display, at least an identifier of each of the plurality of available communication sessions that the user may employ CS selector 570 to select to monitor and/or control with CS module 500. As such, selected CS(s) indicator may include one or more displays. In at least one embodiment, CS selector 570 and selected CS(s) indicator 572 may be integrated within a touch-sensitive display.

Software-implemented CS module 590 of FIG. 5B may include similar functionality that that of CS module 500. For instance, CS module 590 may include a selected CS(s) indicator that provides the user indications or identifications of the plurality of communication sessions that are available to monitor and/or control. CS module 590 may include a CS selector that enables the user to select one or more communication sessions from the plurality of available communications to monitor and/or control. The selected CS(s) indicator may provide the user an indication of which of the plurality of available communication sessions are actively being monitored and/or controlled by CS module 590.

In addition to monitoring of the status of a communication session, various embodiments of a CS module enable at least the partial controlling of the CS status. A CS module may include one or more CS controls to control the status of the associated communication session. The CS controls may include one or more keypads, buttons, switches, touch interfaces (such as a touch-sensitive display), pointing device interfaces, input/output interfaces, and the like.

For instance, a CS module may include at least one button (either physical or virtual) to transition a status of an associated microphone between a mute state and an on state. Likewise, a CS module may include one or more other buttons to transition a status of an associated camera between an on state and an off state. CS module 500 of FIG. 5A includes button 552 to mute and unmute an associated microphone and button 554 to turn on and off an associated camera. Similarly, CS module 590 of FIG. 5B includes virtual button 596 to mute and unmute an associated microphone and virtual button 596 to turn on and off an associated camera. A CS module may include other CS controls, such as but not limited to a touch sensitive display device, pointing devices, and the like, such that a user may interactively control the status of a communication session. Accordingly, various embodiments of CS modules provide more capability than passively monitoring the CS status, but also are operative to provide interactive control of the CS status.

When a user of the CS module controls the CS status, the indicators of the CS module are automatically updated to reflect the updated CS status of the communication session. For instance, the photon emitters may transition an operational state and if enabled by the user, the audio emitter may provide an audible indication of the transition of the CS status. In at least one embodiment, an indicator of the transition of the CS status is provided to the associated computer device. For instance, a "pop up" indicator or alert may be provided to a UI displayed on the computer device when a mute button is enabled on the CS module.

In at least some embodiments, a CS module may include one or more displays. The display may provide a display for the associated communication session. For instance CS module 500 of FIG. 5A includes display 550, that displays, in real time, at least one other participant in a video communication session. In at least one embodiment, display 550 is a touch sensitive display.

In addition to controlling the CS status with buttons, touch sensitive displays (such as display 550 of CS module 500), and the like, a CS module may automatically control at least a portion of the CS status via the detection of one or more trigger events. The trigger events may be audible, visual, and/or environmental trigger events. The CS module may include one or more communication-event (or event) sensors, such as but not limited to one or more photon sensors (such as but not limited to infrared and/or visible spectrum cameras), audio sensors (such as but not limited to microphones), open air gesture interfaces (including but not limited to motion sensors), and the like. For instance, CS module 500 of FIG. 5A includes microphone 562 and camera 540. In at least one embodiment, a user may employ one or more microphones and/or one or more cameras included in a CS module to interactively participate in the communication session. As shown in FIG. 5A, speaker 556 and display 550 may enable a user to at least hear and view a communications session. In various embodiments, the CS module may employ other audio sensors, photon sensors, and other sensors, such as a microphone or a camera included in an associated or paired computer, to detect trigger events.

The trigger events may be an audible event, detected via a microphone (or other audible sensor) included in the CS module or another associated or paired microphone, such as a microphone included in the computer employed to participate in the communication session. The triggering events may include environmental events, such as motion by one or more participants in the communication session. A trigger event may be associated with one or more control keywords or control phrases. As such, controlling the status of a communication session may be voice activated, via a CS module, by one or more users.

As mentioned above, various embodiments of CS modules include one or more audio detectors, such as a microphone, to detect or sense audio information. In such embodiments, a CS module may detect audible trigger events via a user voicing a control keyword or control phrase. Upon detection of a trigger event, the CS module may transition the CS status based on the detected triggering event. For instance, if a user voices the control keyword "MUTE," the CS module will detect the control keyword and automatically transition the associated microphone to a mute state. The muted microphone may be the microphone included in the CS module or another associated microphone. As such, a CS module may respond to control keywords or phrases, via the detection of one or more audible triggering events. Various embodiments of voice recognition methods may be employed in the detection of triggering events relating to keywords or commands.

In such embodiments, a CS module may actively "listen" to a communication session and detect audible triggering events to discriminate amongst various control conditions or criteria. In addition to a control keyword or phrase, a triggering event may include the detection of a noise level in the room that houses the CS module. When an associated microphone detects or senses a noise level above a predetermined decibel threshold, the CS module may automatically transition the microphone status to a mute state. The microphone employed to detect a, audible triggering event may be a microphone included in the CS module, or another associated microphone, such as the microphone included in an associated computer, or a combination thereof. The decibel threshold may be interactively selectable and/or provided by the user.

In addition to control keywords or phrases, audible trigger events may be associated with forbidden keywords or phrases. For instance, forbidden keywords or phrases may include offensive keywords or phrases. When a forbidden keyword or phrase is detected, the CS module may automatically transition the status of the detecting microphone to a mute state. In at least one embodiment, the CS module may be operative to substitute the forbidden word or phrase with an alternative pre-selected (non-forbidden) keyword or phrase. In this way, the CS module prevents offensive words or phrases from accidental transmission during a communication session.

A user-supplied dictionary may be employed to define both control and forbidden keywords or phrases. The dictionary may provide a map or a lookup table associating control keywords or phrases with transitions of the CS status, as well as an association between forbidden keywords or phrases and substitute keywords or phrases. A user may provide such a dictionary or lookup table. In at least one embodiment, a CS module may be trained, via one or more machine learning methods, to recognize at least control keywords and/or phrases or forbidden keywords and/or phrases.

A CS module may employ various voice or pattern recognition methods to recognize either control and/or forbidden keywords or phrases. A CS module may be trained, via voice or speaker recognition methods, to recognize the voice patterns of particular users. Spectral or frequency domain analysis may be employed when training a CS module to recognize the voice of a particular user. When detecting the voice of a particular user, the CS module may automatically transition the status of an associated microphone to an on or a muted states. Accordingly, the CS module will prevent the accidental transmission of the voice of particular users when the user prefers that their voice not be transmitted during a communication session. The user may select whether their voice is to be transmitted or muted for a particular communication session.

In addition to detecting audible trigger events, a CS module may detect one or more visual and/or environmental trigger events, via one or more other communication-event sensors, included in or associated with the CS module. Such other event sensors include photon sensors (or cameras), proximity sensors, motion detectors, open air gesture interfaces, and the like. For instance, a CS module may detect a level of light in the room that houses the CS module, via one or more cameras. If the light level is below a luminosity threshold, the status of an associated camera may be transitioned to an off state. Similarly, one or more cameras (such as an infrared camera) may detect or sense a number of users within a room housing the CS module or the CS client computer. If the number of user is less than a user-selectable participant threshold, the CS module may automatically transition one or more associated cameras to the off state. Each triggering event, including audible, environmental, and/or visual triggering events, may be completely configurable via a user.

CS module 400 of FIG. 4 may represent, for example, at least one embodiment of CS modules 112-116 of system 100 of FIG. 1. CS module 400 may be implemented in a device, such as CS module 500 of FIG. 5A, in software such as CS module 590 of FIG. 5B, and/or a combination thereof. Accordingly, each of the components discussed below in conjunction with CS module 400 may be implemented in hardware, software, or a combination thereof. Thus, each of the below discussed components may include virtual and/or physical features and/or implementations. Various embodiments of CS modules may include more or less features and/or functionality than exemplary embodiment CS module 400.

CS module 400 may include processor 402, such as a central processing unit (CPU), and/or logic devices 468 in communication with memory 404 via bus 428. Logic circuitry 468 may be an embedded logic hardware device in contrast to or in complement to processor 402. The embedded logic hardware device would directly execute its embedded logic and/or firmware 420 to perform actions, e.g., an Application Specific Integrated Circuit (ASIC), Field Programmable Gate Array (FPGA), and the like. Also, in one or more embodiments (not shown in the figures), the CS module 400 may include a hardware microcontroller instead of a CPU. In at least one embodiment, the microcontroller would directly execute its own embedded logic to perform actions and access it's own internal memory and it's own external Input and Output Interfaces (e.g., hardware pins and/or wireless transceivers) to perform actions, such as System On a Chip (SOC), and the like.

CS module 400 may also include communication-session (CS) status indicators 470, communication-event sensors 480, and communication-session (CS) controls 490. CS module 400 may also include power supply 430, network interface 432, processor-readable stationary storage device 434, input/output interface 438, and global positioning systems (GPS) receiver 458.

CS status indicators 490 include various audio and/or visual status indicators that are operative to provide a user the CS status of a communication session. Such status indicators include but are not otherwise limited to display 450, audio emitter 456, haptic interface 464, photon emitters 446, and the like. Communication-event sensors 480 include various sensors that are operative to detect various events relating to a communication session. Such communication-event sensors may include, but are not otherwise limited to photon sensors 440, one or more audio sensors 462, open air gesture interface 460, and the like. Photon sensors 440 may include one or more cameras, such as but not limited to visual and/or infrared cameras. Audio sensors may include one or more microphones 462. CS controls 490 include various controls that enable a user to at least partially control the CS status of a communication session. CS controls 490 may include keypad 452, touch interface 444, pointing device interface 466, input/output interface 438, and the like. CS module 400 may communicate with any of CS client computers 102-106, CS server computer 110, or any of CS module 112-116 of system 100.

Power supply 430 may provide power to CS module 400. A rechargeable or non-rechargeable battery may be used to provide power. For instance, power supply 420 may include one or more Alkaline, NiMH, or Lithium-ion batteries. The power may also be provided by an external power source, such as an AC adapter or a powered docking cradle, including a USB connection that supplements and/or recharges the battery.

GPS transceiver 458 can determine the physical coordinates of CS module 400 on the surface of the Earth, which typically outputs a location as latitude and longitude values. Physical coordinates of a CS module that includes a GPS transceiver may be referred to as geo-location data. GPS transceiver 458 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of CS module 400 on the surface of the Earth. It is understood that under different conditions, GPS transceiver 458 can determine a physical location for CS module 400. In at least one embodiment, however, CS module 400 may, through other components, provide other information that may be employed to determine a physical location of the CS module, including for example, a Media Access Control (MAC) address, IP address, and the like. In at least one embodiment, GPS transceiver 458 is employed for localization of the various embodiments discussed herein. For instance, the various embodiments may be localized, via GPS transceiver 458, to customize the linguistics, technical parameters, time zones, configuration parameters, units of measurement, monetary units, and the like based on the location of a user of CS module 400.

Network interface 432 includes circuitry for coupling CS module 400 to one or more networks, CS client computers, CS server computers, and/or other CS modules. Accordingly, CS module 400 may be paired with one or more CS client computers, CS server computers, and/or other CS modules, via network interface 432. Network interface 432 is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 432 is sometimes known as a transceiver, transceiving device, or network interface card (NIC). Network 432 may be a BLUETOOTH™ transceiver, a ZIGBEE™ transceiver, or the like.

Memory 404 may include RAM, ROM, and/or other types of memory. Memory 404 illustrates an example of computer-readable storage media (devices) for storage of information such as computer-readable instructions, data structures, program modules or other data. Memory 404 may store system firmware 408 (e.g., BIOS) for controlling low-level operation of CS module 400.

Memory 404 may further include one or more data storage 410, which can be utilized by CS module 400 to store, among other things, applications 420 and/or other data. For example, data storage 410 may store communication data 412 generated, transmitted, provided, or the like within a communication session. Data storage 410 may further include program code, data, algorithms, and the like, for use by a processor or logic circuitry, such as processor 402 or logic devices 468 to execute and perform actions. In one embodiment, at least some of data storage 410 might also be stored on another component of CS module 400, including, but not limited to, non-transitory, processor-readable stationary storage device 434, or even external to the CS module. Although not shown, various embodiments of CS module 400 may include removable storage device 436 may be a USB drive, USB thumb drive, dongle, or the like.

Applications 420 may include computer executable instructions which, when executed by CS module 400, transmit, receive, and/or otherwise process instructions and data. Applications 420 may include communication-session (CS) client. CS client may at least partially enable one or more communication sessions. Other examples of application programs that may be included in applications 420 include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

As discussed throughout, status indicators included in CS status indicators 470 provide a user with the CS status of a communication. Such indicators may at least indicate whether microphone 462 is muted or on, and if on, a volume level of the microphone. Such a CS status indicator may include display 450. Display 450 may be a liquid crystal display (LCD), gas plasma, electronic ink, light emitting diode (LED), Organic LED (OLED) or any other type of light reflective or light transmissive display that can be used with a computer. Display 450 may also include a touch interface 444 arranged to receive input from an object such as a stylus or a digit from a human hand, and may use resistive, capacitive, surface acoustic wave (SAW), infrared, radar, or other technologies to sense touch and/or gestures. As discussed further below, touch interface 444 may be included in CS controls 490 so that the user may at least partially control the CS status of a communication session.

Audio emitter 456 included in CS status indicators 470 and microphone 462 included in CS sensors may be coupled to an audio interface included in CS module 400. Audio emitter 456 may include at least an audio speaker. The audio interface may be arranged to produce and receive audio signals such as the sound of a human voice. For example, audio emitter 456 and microphone 462 enable a communication session that transmits audio information and/or data. Microphone 462 may be used to control the CS status of a communication session, e.g., using voice recognition, detecting touch based on sound, and the like. Microphone 462 may be used to capture audio content, information, or data transmitted in a communication session. Audio emitter 456 may be operative to provide transmitted audio content within a communication session.

Haptic interface 464 may be arranged to provide a tactile indicator regarding the CS status of a communication session to a user of a CS module 400. For example, the haptic interface 464 may be employed to vibrate CS module 400 in a particular way when microphone 462 and/or photon sensors 440 is turned on or transitioned from an off or mute state.

CS status indicators 470 may also include one or more photon emitters 446 to provide a visual indicator regarding the CS status of a communication session to a user of a CS module 400. For example, photon emitters 446 may include at least a lighting emitting diode (LED) corresponding to microphone 462 and at least another LED corresponding to camera 440. The corresponding LED may turn on, off, or transition to a different color when microphone 462 and/or camera 440 is turned on or transitioned from an off or mute state, or the like.

As mentioned above, communication-event sensors 480 may include one or more cameras 440, one or more microphones 462, and an open air gesture interface 460. Although not shown, CS module 400 may include a video interface. The video interface may be arranged to capture video images, such as a still photo, a video segment, an infrared video, or the like. For example, the video interface may be coupled to cameras 440, such as but not limited to a digital video camera, a web-camera, or the like. Video interface may comprise a lens, an image sensor, and other electronics. Image sensors may include a complementary metal-oxide-semiconductor (CMOS) integrated circuit, charge-coupled device (CCD), or any other integrated circuit for sensing light. Cameras 440 and/or the video interface may be used to capture image and/or video information and/or data to transmits during a communication session. Camera 440 may be used to track physical eye movements of a user of CS module 400.

Open air gesture interface 460 may sense physical gestures of a user of CS module 400, for example, by using single or stereo video cameras, radar, a gyroscopic sensor inside a computer held or worn by the user, or the like.

CS controls 490 may include a keypad 452. Keypad 452 may comprise any input device arranged to receive input from a user. For example, keypad 452 may include a push button numeric dial, or a keyboard. Keypad 452 may also include command buttons that are associated with selecting and sending images. Keypad 452 may be operative to enable to user to transition camera 440 and/or microphone 462 between an off (mute) state and an on (or alive) state.

CS controls 490 may also comprise input/output interface 438 for communicating with external peripheral devices or other computers such as other CS modules and network computers. In some embodiments, input/output interface 438 may enable CS module 400 to connect and communicate with one or more other computers, such as but not limited to CS client computers 102-106, CS sever computer 110, or other CS modules 112-116 of FIG. 1. Other peripheral devices that CS module 400 may communicate with may include remote speakers and/or microphones, headphones, display screen glasses, or the like. Input/output interface 438 can utilize one or more technologies, such as Universal Serial Bus (USB), Infrared, Wi-Fi, WiMax, BLUETOOTH™, ZIGBEE™, wired technologies, or the like.

Human interface components can be peripheral devices that are physically separate from CS module 400, allowing for remote input and/or output to CS module 400. For example, information routed as described here through human interface components such as display 450 or keyboard 452 can instead be routed through network interface 432 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™ Zigbee™ and the like. One non-limiting example of a CS module with such peripheral human interface components is a wearable computer, which might include a remote pico projector along with one or more cameras that remotely communicate with a separately located CS module to sense a user's gestures toward portions of an image projected by the pico projector onto a reflected surface such as a wall or the user's hand.

CS controls 490 may include touch interface 444 and/or pointing device interface 466. Touch interface 444 and/or pointing device interface 466 may enable a user may to at least partially control the CS status of a communication session. For instance, touch interface 444 may be operative to enable a user to transition camera 440 and/or microphone 462 between an off (mute) state and an on (or alive) state.

So, in some embodiments, CS module 400 may be enabled to employ various embodiments, combinations of embodiments, processes, or parts of processes, as described herein. Moreover, in various embodiments, CS module 400 may be enabled to employ various embodiments described above in conjunction with FIG. 1.

Generalized Operations

The operation of certain aspects of the invention will now be described with respect to FIGS. 6-9. In at least one of various embodiments, processes 600, 700, 800, and 900 described in conjunction with FIGS. 6-9, respectively, or portions of these processes may be implemented by and/or executed by any of the various embodiments of CS modules discussed herein, including but not limited to CS modules 112-106, 400, 500, or 590 of FIGS. 1, 4, 5A, and 5B respectively. Portions of these processes may be implemented by and/or executed a network computer, such as client computer 300 of FIG. 3. In other embodiments, these processes or portions of these processes may be implemented by and/or executed on a plurality of network computers, such as network computer 300 of FIG. 3. Further, in other embodiments, these processes or portions of these processes may be implemented by and/or executed on one or more mobile computers, such as mobile computer 200 as shown in FIG. 2. Also, in at least one of the various embodiments, these processes or portions of these processes may be implemented by and/or executed on one or more cloud instances operating in one or more cloud networks. However, embodiments are not so limited and various combinations of network computers, client computer, cloud computer, or the like, may be utilized. These processes or portions of these processes may be implemented on any computer, device, or module of FIG. 1.

Figure 6:
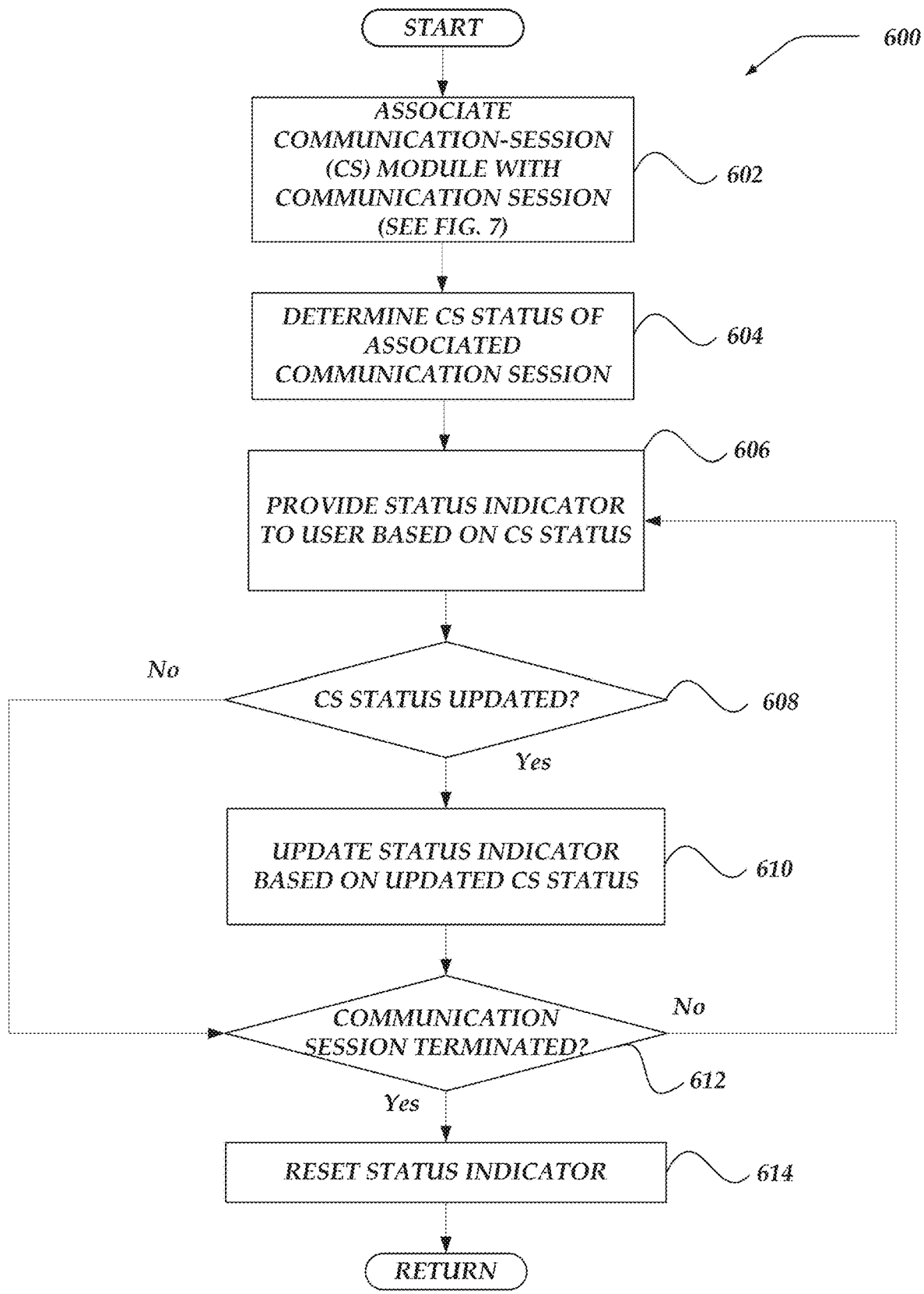
FIG. 6 shows an overview flowchart for a process for employing a communication-session module to monitor and control a communication session in accordance with at least one of the various embodiments.

FIG. 6 shows an overview flowchart for a process for employing a communication-session (CS) module to monitor and control a communication session in accordance with at least one of the various embodiments. Process 600 begins after a start block, at block 602, where one or more CS modules are associated with one or more communication sessions. Various embodiments for associating a CS module with one or more communication sessions are discussed in at least conjunction with process 700 of FIG. 7. However briefly, at block 602, a CS module is associated with one or more communication sessions. When associated with a communication session, the CS module may be further associated with one or more specific computers, microphones, and/or cameras employed to participate in the communication session. A CS module may be associated with one or more users of the associated computer, microphone, and/or camera. In some embodiments, a CS module may be associated with one or more other CS modules. The computer, microphone, camera, other CS modules, or users may be associated with the associated communication session.

When associated with a specific computer, microphone, camera, or other CS modules, a CS module may be operative to communicate with the associated computer, microphone, camera, or other CS modules. Accordingly, when associated with a specific computer, microphone, camera, or other CS modules, the CS module and the associated computer/microphone/camera/other CS module may be communicatively paired.

Additionally, when associated with a specific computer, microphone, camera, or other CS modules, a CS module may be operative to actively determine the status of a communication session (CS status) and provide one or more status indicators that indicate a current status of the computer, microphone, camera, or other CS module. The CS module may be operative to at least partially control the status of the computer, microphone, camera, or other CS module.

At block 604, the CS status is determined of the associated communication session. The determined CS status may include a microphone state or a microphone status of an associated microphone. The CS status may include the state or status of other audio detecting devices associated with the communication session or the CS module, such as but not limited to a microphone included in or coupled to a computer device within the communication session that is employed to detect audio information, generated by a user of the communication session.

A microphone status (or state) may include the volume level of a microphone employed to detect audio information to transmit during the communication session. In at least one embodiment, a microphone state may include whether the microphone is in a microphone "mute" or "off" state or a microphone "live" or "on" state.

A communication-session status may include a camera state or a camera status of a camera or other image detecting device associated with a communication session, such as but not limited to a camera included in or otherwise coupled to the computer device within the communication session that is employed to detect image and/or video information. In at least one embodiment, a camera state (status) may include whether the camera is in an "off" state or a "live" or "on" state. Determining the CS status at block 604 may include determining the current status of the associated communication session, including at least but not limited to determining the current status of the associated microphone and/or the associated camera.

At block 606, one or more status indicators are provided to one or more users based on the CS status. The one or more status indicators may include one or more audio indicators, one or more visual indicators, one or more haptic indicators, or any combination thereof. The specific combination of indicator types provided by a CS module may be selectable by the user.

Visual indicators may include one or more photon emitters included in the CS module. Photon emitters include but are not limited to light emitting diodes (LEDs). The one or more photon emitters indicate the current status of the associated microphone and/or the current status of the associated camera. A characteristic of the one or more LEDs may be modulated, transitioned, or otherwise controlled to indicate the current status of the associated microphone or camera. Such LED characteristics may include but are not otherwise limited to color and/or intensity. A mode of the LED may be controlled, such as whether the LED is in an on or off state, or whether the LED is constantly emitting photons, or is in a blinking or pulsing mode to indicate the current status of the associated microphone or camera.

In at least one embodiment, one or more photon emitters associated with the microphone emits green photons when the microphone status is in an on or live state and emits red photons when the microphone status is in a mute or off state. Similarly, one or more other photon emitters associated with a camera emits green photons when the camera status is in an on or live state and emits red photons when the camera status is in an off state. The one or more photon emitters associated with the one or more microphones may be separate from the one or more photon emitters associated with the one or more cameras.

Various embodiments of CS modules may also include one or more audio emitters, such as but not limited to audio speakers. The one or more audio emitters may be operative to provide audio indicators that at least partially indicate the status of the associated communication session. The CS module may provide an audible indicator such as one or more tones, via the audio emitter, indicating the status of the associated one or more microphones and/or cameras. In at least one embodiment, the CS module may provide a human voice that indicates an associated microphone and/or camera status. In an exemplary embodiment, the human voice may announce "MUTE" when the status of the associated microphone is transitioned to or is already in a mute state. Similarly, the human voice may announce, "LIVE" when the microphone is transitioned to or is already in an on or live state.

The audio indicator of the current CS status may be provided when the CS status is transitioned and/or at predetermined frequencies. The predetermined frequencies may be user-selectable frequencies. For instance, a CS module may provide an audio indicator of a microphone's current state every 5 minutes, or any other interval. In at least one embodiment, a user may be enabled to interactively provide and/or select the predetermined frequency of one or more audio indicators.

A haptic interface included in a CS module may provide haptic or tactile feedback indicating the CS status of a communication session. For instance, a CS device may vibrate when the status of the associated microphone or camera is transitioned. A user-selectable frequency for providing the one or more haptic indicators may be employed in a similar fashion to the frequency discussed above for providing audio indicators to the user. The user may select whether visual, audio, haptic indicator types, or any combination thereof, are provided by the CS module. For instance, the user may select whether to provide only indicators via the photon emitters, or whether to also provide audio and/or haptic indicators as well to indicate the CS status, or any combination thereof.

At decision block 608, it is determined whether the CS status of the associated communication session has been updated. For instance, an updated CS status may include the transitioning of an associated microphone to a mute state or turning on or off an associated camera. If the CS status has been updated, process 600 flows to block 610. Otherwise process 600 flows to block 612.

At block 610, the one or more status indicators are updated based on the updated CS status. For instance, one or more photon emitters associated with a microphone that was transitioned from a mute state to an on state, are updated to emit green photons. Similarly, the one or more photon emitters associated with a microphone that was transitioned from an on state to a mute state, are updated to emit red photons. One or more photon emitters associated with a camera that was transitioned from an off state to an on state, are updated to emit green photons. Similarly, the one or more photon emitters associated with a camera that was transitioned from an on state to a off state, are updated to emit red photons. Likewise, audible and/or haptic status indicators may be similarly updated based on the updated CS status. At block 610, the one or more updated status indicators may be provided to the user.

At decision block 612, it is determined if the associated communication status is terminated. If the communication session has not been terminated, process 600 flows to block 606, where the one or more status indicators are provided to the user based on the CS status. Otherwise, process 600 flows to block 614, where the or more status indicators are reset. Resetting a status indicator may include transitioning the status indicator to a default state or mode. In at least one embodiment, resetting a status indicator may include turning off a status indicator. Process 600 terminates and/or returns to a calling process to perform other actions.

Figure 7:
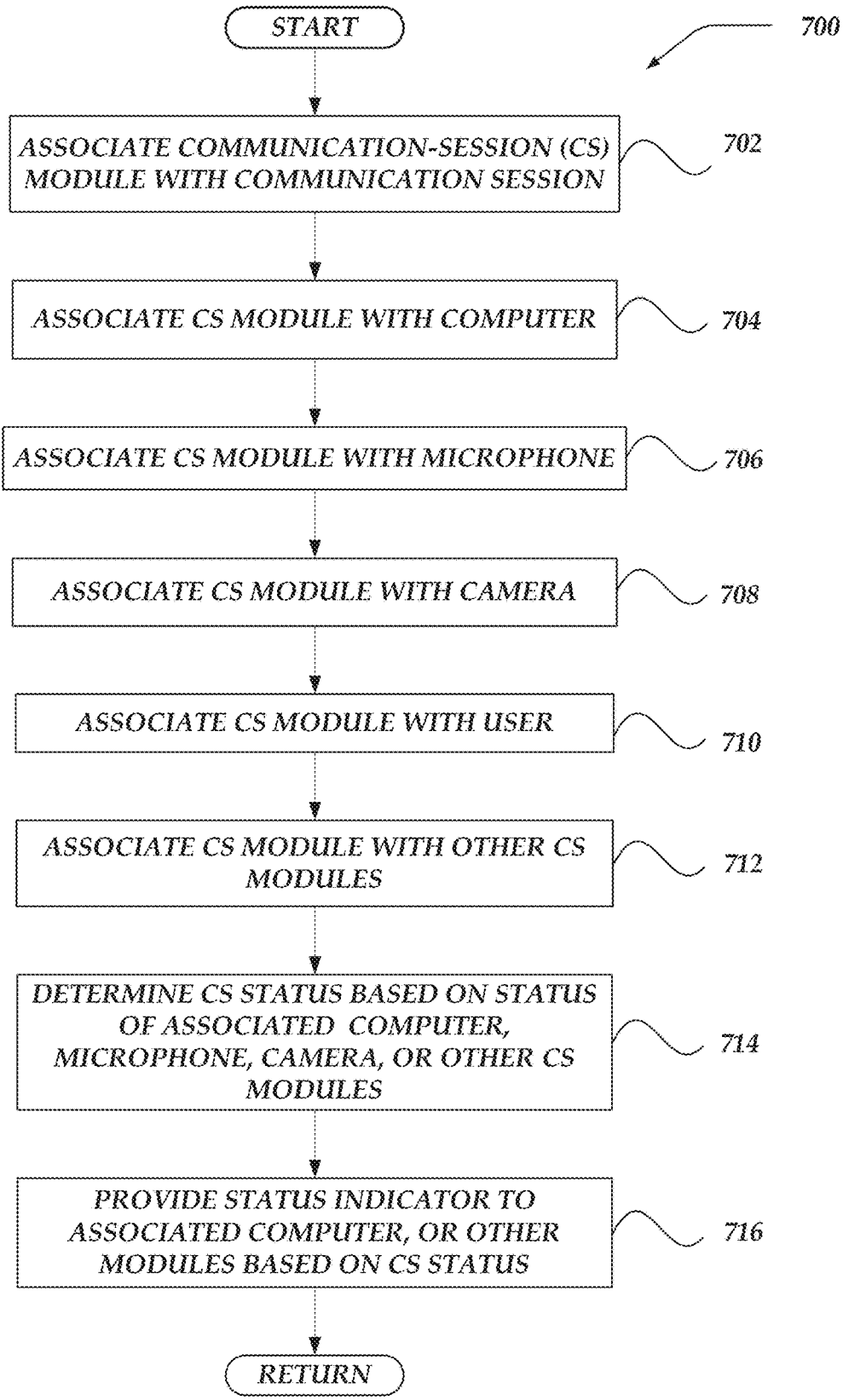
FIG. 7 shows an overview flowchart for a process for associating a communication-session module to a communication session in accordance with at least one of the various embodiments.

FIG. 7 shows an overview flowchart for a process for associating a communication-session (CS) module to a communication session in accordance with at least one of the various embodiments. Process 700 begins, after a start block, at block 702 where the CS module is associated with a communication session. The communication session may be an ongoing communication session or the communication session may have yet to be started. Associating the CS module with a communication session may include pairing the CS module with the communication session. A user may employ various CS controls or user interfaces included in the CS module to associate the CS module with the communication session.

At block 704, the CS module is associated with one or more computers, such as but not limited to one or more CS client computers and/or one or more CS server computers. In some embodiments, at least one of the one or more associated computers may be employed to participate in the communication session. A computer employed to participate in and/or monitor the communication session may be associated with the communication session.

At block 706, the CS module is associate with one or more microphones. In some embodiments, at least one of the one or more associated microphones may be employed to participate in the communication session. A microphone employed to participate in the communication session may be associated with the communication session. In at least one embodiment, an associated microphone may be included in the associated computer. An associated microphone may be separate from the associated computer. In at least one embodiment, the associated microphone may be included in the CS module. A microphone included in the CS module may be employed to participate in the associated communication session.

At block 708, the CS module is associated with one or more cameras. In some embodiments, at least one of the one or more associated cameras may be employed to participate in the communication session. A camera employed to participate in the communication session may be associated with the communication session. In at least one embodiment, an associated camera may be included in the associated computer. An associated camera may be separate from the associated computer. In at least one embodiment, the associated camera may be included in the CS module. A camera included in the CS module may be employed to participate in the associated communication session.

At block 710, one or more users may be associated with the CS module. An associated user may be a participant in the associated communication session. In some embodiments, the associated user may be a user of at least one of the one or more associated computers, microphones, and/or cameras. In at least one embodiment, the associated user may be a user of the CS module. The CS module may recognize keywords or phrases voices by an associated user. In some embodiments, the CS module may trained, via training data, at least recognize the voice of the associated user.

At block 712, the CS module may be associated with one or more other CS modules. At least one of the one or more other CS modules may be employed to at least monitor, control, or participate in the CS status of the associated communication session. In some embodiments, an associated other CS module may be associated with the communication session. An associated other CS module may be paired with or daisy chained to the CS module. The other module may be in a separate room than the CS module.

At block 714, the CS status of the associated communication session may be determined. The CS status may be based on the status of at least one of the associated computer, microphone, camera, or other CS modules. At block 716, one or more status indicators are provided to a user of the CS module. Process 700 terminates and/or returns to a calling process to perform other actions.

Figure 8:
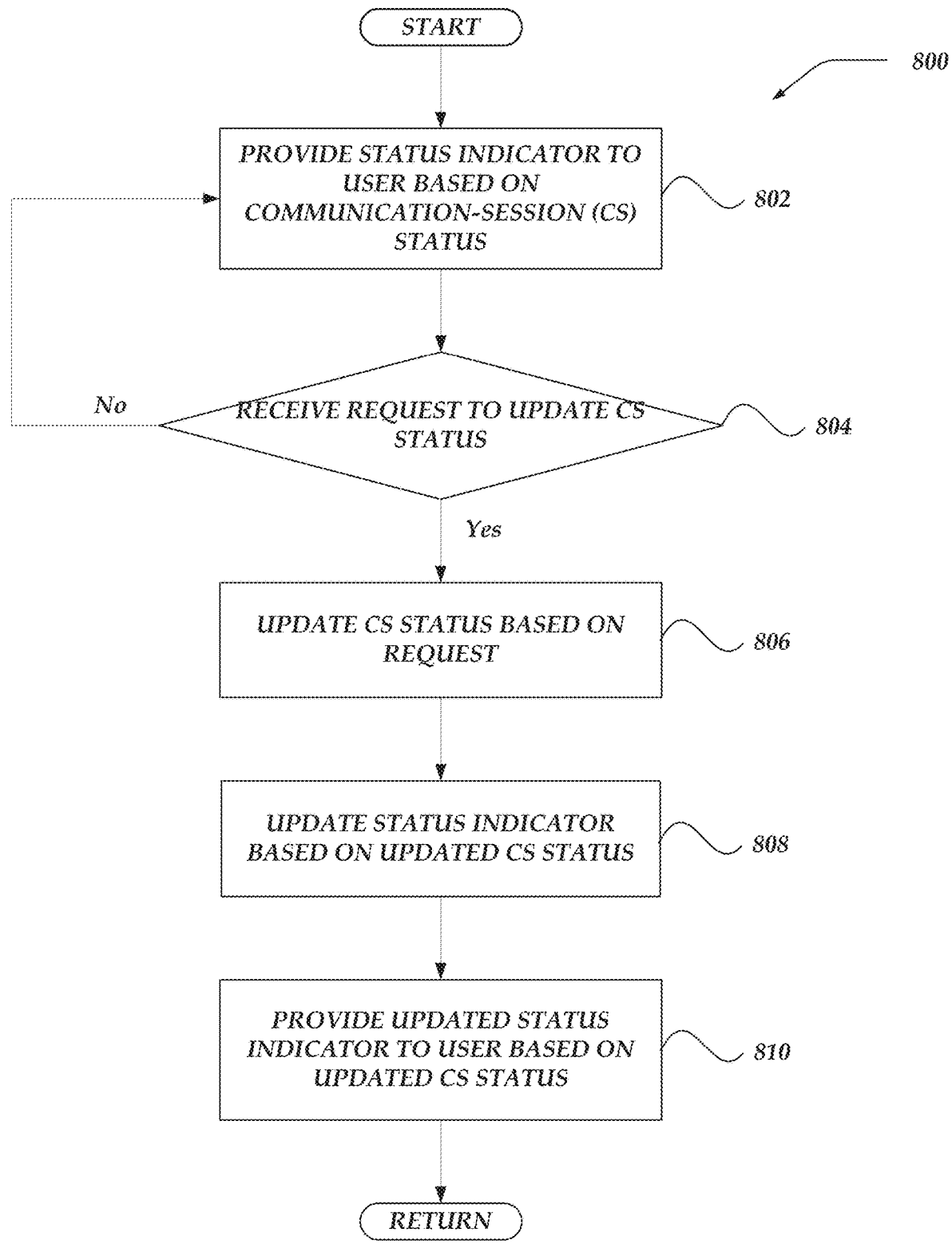
FIG. 8 shows an overview flowchart for another process for employing a communication-session module to monitor and control a communication session in accordance with at least one of the various embodiments.

FIG. 8 shows an overview flowchart for another process for employing a communication-session (CS) module to monitor and control a communication session in accordance with at least one of the various embodiments. After a start block, process 800 begins at block 802, where one or more status indicators are provided to one or more users based on a CS status. Providing one or more status indicators to one or more users at block 802 may include similar features as discussed in conjunction with at least block 606 of process 600 of FIG. 6.

At decision block 804, it is determined whether a request to update the CS status. A request to update the CS status may be received when a user of the CS module employs the CS module to control the status of the communication sessions. For instance, a CS module may include one or more CS controls to control the status of the associated communication session. The CS controls may include one or more keypads, buttons, switches, touch interfaces (such as a touch-sensitive display), pointing device interfaces, input/output interfaces, and the like. A request to update the CS status may be received when the user control the CS status via the one or more CS controls included in the CS module.

A CS module may include at least one button (either physical or virtual) to transition a status of an associated microphone between a mute state and an on state. Likewise, a CS module may include one or more other buttons to transition a status of an associated camera between an on state and an off state. A CS module may include other CS controls, such as but not limited to a touch sensitive display device, pointing devices, and the like, such that a user may interactively control the status of a communication session. A request to update the CS status may be received when a user employs the CS controls of the CS module to transition an associated camera or microphone between an off and an on state. If a request to transition the CS status is received, process 800 flows to block 806. Otherwise, process 800 flows to block 802 to continue providing the one or more status indicators to the user.

At block 806, the CS status is updated based on the received request. For instance, if the received request indicates to transition the status of an associated microphone to a mute state, the CS status is updated so that the status of the associated microphone is in the mute state. Accordingly, a user may employ a CS module to at least partially control the communication status.

At block 808, the one or more status indicators are updated based on the updated CS status. In some embodiments, updating the one or more status indicators includes updating one or more status indicators that are affected by the updated CS status. In at least one embodiment, updating the one or more status indicators at block 808 may include similar features to updating the one or more status indicators at block 610 of process 600 of FIG. 6.

At block 810, the one or more updated status indicators are provided to the user based on the updated CS status. In at least one embodiment, providing the updated one or more status indicators at block 810 may include similar features to providing one or more status indicators to the user at block 606 of process 600 of FIG. 6. Process 800 terminates and/or returns to a calling process to perform other actions.

Figure 9:
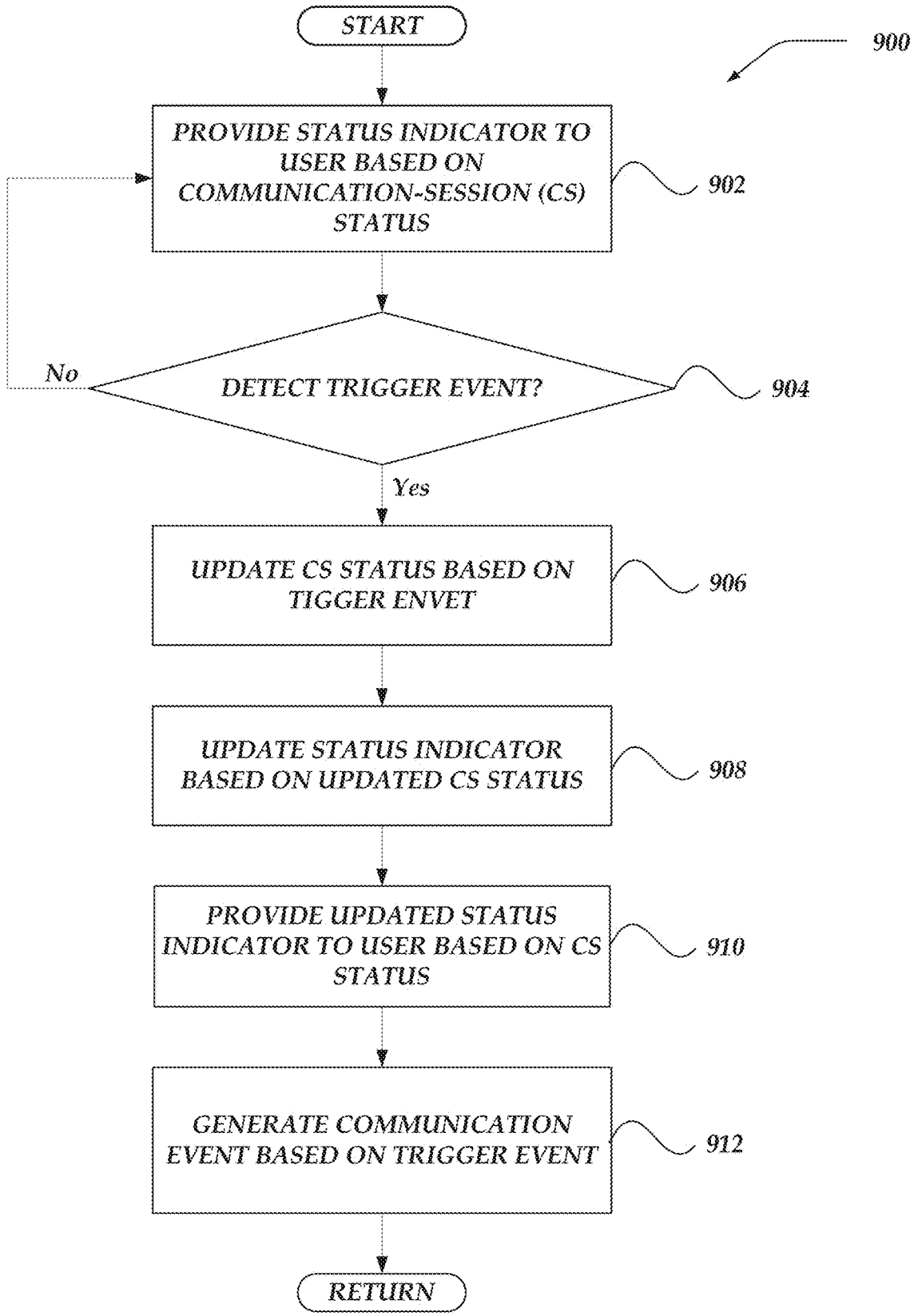
FIG. 9 shows an overview flowchart for another process for employing a communication-session module to monitor and control a communication session in accordance with at least one of the various embodiments.

FIG. 9 shows an overview flowchart for another process for employing a communication-session (CS) module to monitor and control a communication session in accordance with at least one of the various embodiments. Process 900 starts, after a start block, at block 902, where one or more status indicators are provided to the user based on the CS status. In at least one embodiment, providing the one or more status indicators at block 902 may include similar features to providing one or more status indicators to the user at block 606 of process 600 of FIG. 6.

At decision block 904, it is determined whether a trigger event is detected. In addition to controlling the CS status via one or more received requests to update the CS status (such as the embodiments discussed in conjunction with process 800 of FIG. 8), a CS module may automatically control at least a portion of the CS status via the detection of one or more trigger events. The trigger events may be audible, visual, and/or environmental trigger events. The CS module may include one or more communication-event (or event) sensors, such as but not limited to one or more photon sensors (such as but not limited to infrared and/or visible spectrum cameras), audio sensors (such as but not limited to microphones), open air gesture interfaces (including but not limited to motion sensors), and the like. In at least one embodiment, a user may employ one or more microphones and/or one or more cameras included in a CS module to interactively participate in the communication session. In various embodiments, the CS module may employ other audio sensors, photon sensors, and other sensors, such as a microphone or a camera included in an associated or paired computer, to detect trigger events.

The trigger events may be an audible event, detected via a microphone (or other audible sensor) included in the CS module or another associated or paired microphone, such as a microphone included in the computer employed to participate in the communication session. The triggering events may include environmental events, such as motion by one or more participants in the communication session. A trigger event may be associated with one or more control keywords or control phrases. As such, controlling the status of a communication session may be voice activated, via a CS module, by one or more users.

As mentioned above, various embodiments of CS modules include one or more audio detectors, such as a microphone, to detect or sense audio information. In such embodiments, a CS module may detect audible trigger events via a user voicing a control keyword or control phrase. In such embodiments, a CS module may actively "listen" to a communication session and detect audible triggering events to discriminate amongst various control conditions or criteria. The microphone employed to detect a, audible triggering event may be a microphone included in the CS module, or another associated microphone, such as the microphone included in an associated computer, or a combination thereof. In addition to a control keyword or phrase, a triggering event may include the detection of a noise level in the room that houses the CS module.

In addition to control keywords or phrases, audible trigger events detected at block 904 may be associated with forbidden keywords or phrases. For instance, forbidden keywords or phrases may include offensive keywords or phrases. A user-supplied dictionary may be employed to define both control and forbidden keywords or phrases. The dictionary may provide a map or a lookup table associating control keywords or phrases with transitions of the CS status, as well as an association between forbidden keywords or phrases and substitute keywords or phrases. A user may provide such a dictionary or lookup table. In at least one embodiment, a CS module may be trained, via one or more machine learning methods, to recognize at least control keywords and/or phrases or forbidden keywords and/or phrases.

A CS module may employ various voice or pattern recognition methods to recognize either control and/or forbidden keywords or phrases. A CS module may be trained, via voice or speaker recognition methods, to recognize the voice patterns of particular users. Spectral or frequency domain analysis may be employed when training a CS module to recognize the voice of a particular user In addition to detecting audible trigger events, a CS module may detect one or more visual and/or environmental trigger events, via one or more other communication-event sensors, included in or associated with the CS module. Such other event sensors include photon sensors (or cameras), motion sensors (or detectors), proximity sensors, open air gesture interfaces, and the like. For instance, a CS module may detect a level of light in the room that houses the CS module, the number of users within a room, and the like.

A triggering event may include determining when a distance between a CS module and one or more users either is less than or greater than a distance threshold. The distance threshold may be a predetermined threshold, or selectably provided by a user. Some embodiments may include a safe mode. When operated in the safe mode, a CS device employs one or more proximity sensors to determine a proximate distance between the CS module and one or more users. When the one or more proximity sensors determines the distance between the one or more users to be greater than a threshold distance, the CS module may provide an indication that the communication session is still live and has not been terminated. The indication may be a warning, such as a visual or audible indication. For instance, one or more of the photon emitters of the CS module may flash and/or the audio emitter of the CS module may provide a tone or beep to warn the user, even though the user may not be looking at a display of the device that is employed in the communication session. In this way, the safe mode provides a warning to the user, so that the user does not walk away from the CS module and think that the communication session has terminated, when the communication session has not been terminated. Each triggering event, including audible, environmental, and/or visual triggering events, may be completely configurable via a user. Each triggering event, including audible, environmental, and/or visual triggering events, may be completely configurable via a user. If a trigger event is detected at block 904, process 900 flows to block 906. Otherwise, process 900 flows to block 902 to provide the one or more status indicators to the user.

At block 906, the CS status is updated based on the detected trigger event. Updating the CS status at block 906 may include similar features to updating the CS status discussed in conjunction with block 806 of process 800 of FIG. 8. At block 906, the CS module may transition the CS status based on the detected triggering event. For instance, if a user voices the control keyword "MUTE," the CS module will detect the control keyword at block 904. At block 906, the CS module may automatically transition the associated microphone to a mute state. The muted microphone may be the microphone included in the CS module or another associated microphone. Similarly, a user may turn on an off an associated camera by voicing corresponding keywords or phrases, such as "CAMERA ON" or "CAMERA OFF."

As such, a CS module may respond to control keywords or phrases, via the detection of one or more audible triggering events at block 906 and updating the CS status at block 906. Various embodiments of voice recognition methods may be employed in the detection of triggering events relating to keywords or commands.

When an associated microphone detects or senses a noise level above a predetermined decibel threshold at block 904, the CS module may automatically transition the microphone status to a mute state at block 906. The decibel threshold may be interactively selectable and/or provided by the user. When a forbidden keyword or phrase is detected at block 904, the CS module may automatically transition, at block 906, the status of the detecting microphone to a mute state.

When detecting the voice of a particular user at block 904, the CS module may automatically transition the status of an associated microphone to an on or a muted states at block 906. Accordingly, the CS module may prevent the accidental transmission of the voice of particular users when the user prefers that their voice not be transmitted during a communication session. The user may select whether their voice is to be transmitted or muted for a particular communication session.

As noted above, a CS module may detect a level of light in the room that houses the CS module, via one or more cameras. If the light level is below a luminosity threshold, the status of an associated camera may be transitioned to an off state. Similarly, one or more cameras (such as an infrared camera) may detect or sense a number of users within a room housing the CS module or the CS client computer. If the number of user is less than a user-selectable participant threshold, the CS module may automatically transition one or more associated cameras to the off state At block 908, the one or more status indicators may be updated based on the updated CS status. In at least one embodiment, updating the one or more status indicators at block 908 may include similar features to updating the one or more status indicators at block 610 of process 600 of FIG. 6. At block 910, the one or more updated status indicators may be provided to the user.

At block 912, one or more communication events may be generated based on the detected trigger event. A communication event may include providing a user one or more warnings or indications that a trigger event was detected. In some embodiments, a communication event may include substituting a forbidden keyword or phrase to be transmitted. For instance, in at least one embodiment, the CS module may be operative to substitute the forbidden word or phrase with an alternative pre-selected (non-forbidden) keyword or phrase. In this way, the CS module prevents offensive words or phrases from accidental transmission during a communication session. Process 900 terminates and/or returns to a calling process to perform other actions.

It will be understood that each block of the flowchart the illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for monitoring a communication-session (CS) status of one or more communication sessions between a computing device and one or more other computing devices over a network, wherein the computing device performs actions of the method, comprising:

associating, over the network, a local CS module with the one or more communication sessions, wherein at least one of one or more local microphones or one or more local cameras are employed by the computing device to participate in the one or more communication sessions;

employing the one or more local microphones to detect utterance of one or more of a forbidden keyword or a forbidden phrase during the one or more communication sessions;

automatically substituting the one or more forbidden keyword or the forbidden phrase with a pre-selected non-forbidden keyword or non-forbidden phrase for transmission in the one or more communication sessions, wherein the one or more forbidden keyword or the forbidden phrase is blocked from transmission in the one or more communication sessions;

determining a physical proximity of a user to the computing device during participation in the one or more communication sessions;

providing, over the network, the CS status of the one or more communication sessions, wherein the CS status includes at least one of a status of the one or more local microphones, the user's physical proximity, or a status of the one or more local cameras at the computing device, and wherein a proximity sensor is employed to detect the user's physical proximity;

employing the local CS module to provide one or more local status indicators based on the CS status, wherein the one or more status indicators indicate at least one of the status of the one or more local microphones, an alert when the user's physical proximity away from the computing device is greater than a distance threshold for participation in the one or more communication sessions, or the status of the one or more local cameras; and in response to an update of the CS status, updating the one or more local status indicators based on the updated CS status.

2. The method of claim 1, further comprising:
receiving a request to update the CS status based on a user selection of one or more CS controls included in the local CS module;
updating the CS status based on the received request; and
updating the one or more local status indicators based on the updated CS status.

3. The method of claim 1, further comprising:
employing one or more event sensors included in the local CS module to detect one or more trigger events;
updating the CS status based on the trigger event; and
updating the one or more local status indicators based on the updated CS status.

4. The method of claim 1, wherein the one or more local status indicators include at least one of one or more visual indicators, one or more audible indicators, or one or more haptic indicators.

5. The method of claim 1, further comprising:
training the local CS module to recognize a voice specific to the user of the local CS module.

6. A computing device that employs a local communication-session (CS) module for monitoring a CS status of one or more communication sessions with one or more other computing devices over a network, comprising:
one or more local status indicators;
one or more event sensors;
one or more controls; and
one or more hardware processor devices that perform actions, including:
associating, over the network, the local CS module with the one or more communication sessions, wherein at least one of one or more local microphones or one or more local cameras are employed to participate in the one or more communication sessions;
employing the one or more local microphones to detect utterance of one or more of a forbidden keyword or a forbidden phrase during the one or more communication sessions;
automatically substituting the one or more forbidden keyword or the forbidden phrase with a pre-selected non-forbidden keyword or non-forbidden phrase for transmission in the one or more communication sessions, wherein the one or more forbidden keyword or the forbidden phrase is blocked from transmission in the one or more communication sessions;

determining a physical proximity of a user to the computing device during participation in the one or more communication sessions;

providing, over the network, the CS status of the one or more communication sessions, wherein the CS status includes at least one of a status of the one or more local microphones, the user's physical proximity, or a status of the one or more local cameras at the computing device, and wherein a proximity sensor is employed to detect the user's physical proximity;

controlling a mode of the one or more local status indicators based on the CS status, wherein the mode of the one or more local status indicators indicates at least one of the status of the one or more local microphones, an alert when the user's physical proximity away from the computing device is greater than a distance threshold for participation in the one or more communication sessions, or the status of the one or more local cameras; and in response to an update of the CS status, updating the mode of the one or more local status indicators based on the updated CS status.

7. The computing device of claim 6, wherein
the one or more local status indicators includes one or more of light-emitting diodes (LEDs), audio emitters, or haptic interfaces;
the one or more event sensors includes one or more of light photon sensors or audio sensors; and
the one or more controls includes one or more of a keypad or a touch interface.

8. The computing device of claim 6 further comprising at least one of a coupler that couples the CS module to one or more of a display of a computer employed to participate in the one or more communication sessions or a rechargeable power source.

9. The computing device of claim 6, wherein the update of the CS status includes at least one of transitioning the one or more of local microphones between a mute state and an on state or transitioning the one or more local cameras between an off state and an on state.

10. The computing device of claim 6, wherein
the one or more local status indicators indicates at least one of whether the one or more local microphones is in a mute state or whether the one or more local cameras is in an off state; and
the one or more controls generate a request to transition at least one of the one or more local microphones to the mute state or the one or more local cameras to the off state.

11. The computing device of claim 6, wherein the local CS module is implemented as one or more of a separate physical device, a software module, or a firmware module.

12. A processor readable non-transitory storage media that includes instructions to monitor a communication-session (CS) status of one or more communication sessions between a computer, wherein execution of the instructions by one or more processor devices of the computer performs actions, comprising:
associating, over a network, a local CS module with the one or more communication sessions, wherein at least one of one or more local microphones or one or more local cameras are employed by the computing device to participate in the one or more communication sessions;

employing the one or more local microphones to detect utterance of one or more of a forbidden keyword or a forbidden phrase during the one or more communication sessions;

automatically substituting the one or more forbidden keyword or the forbidden phrase with a pre-selected non-forbidden keyword or non-forbidden phrase for transmission in the one or more communication sessions, wherein the one or more forbidden keyword or the forbidden phrase is blocked from transmission in the one or more communication sessions;

determining a physical proximity of a user to the computing device during participation in the one or more communication sessions;

providing, over the network, the CS status of the one or more communication sessions, wherein the CS status includes at least one of a status of the one or more local microphones, the user's physical proximity, or a status of the one or more local cameras at the computing device, and wherein a proximity sensor is employed to detect the user's physical proximity;

employing the local CS module to provide one or more local status indicators based on the CS status, wherein the one or more status indicators indicate at least one of the status of the one or more local microphones, an alert when the user's physical proximity away from the computing device is greater than a distance threshold for participation in the one or more communication sessions, or the status of the one or more local cameras; and in response to an update of the CS status, updating the one or more local status indicators based on the updated CS status.

13. The media of claim 12, further comprising:
receiving a request to update the CS status based on a user selection of one or more CS controls included in the local CS module;
updating the CS status based on the received request; and
updating the one or more local status indicators based on the updated CS status.

14. The media of claim 12, further comprising:
employing one or more event sensors included in the local CS module to detect one or more trigger events;
updating the CS status based on the trigger event; and
updating the one or more local status indicators based on the updated CS status.

15. The media of claim 12, wherein the one or more local status indicators include at least one of one or more visual indicators, one or more audible indicators, or one or more haptic indicators.

16. The media of claim 12, further comprising:
training the local CS module to recognize a voice specific to the user of the local CS module.

* * * * *